(12) United States Patent
Yaguchi et al.

(10) Patent No.: US 8,304,126 B2
(45) Date of Patent: Nov. 6, 2012

(54) FUEL CELL

(75) Inventors: Tatsuya Yaguchi, Yokosuka (JP); Yasushi Nakajima, Kawasaki (JP); Keiko Kushibiki, Fujisawa (JP); Shigeo Ibuka, Ebina (JP); Hirokazu Komatsu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 712 days.

(21) Appl. No.: 12/518,592

(22) PCT Filed: Jan. 31, 2008

(86) PCT No.: PCT/JP2008/052001
§ 371 (c)(1),
(2), (4) Date: Jun. 10, 2009

(87) PCT Pub. No.: WO2008/093896
PCT Pub. Date: Aug. 7, 2008

(65) Prior Publication Data
US 2010/0015503 A1    Jan. 21, 2010

(30) Foreign Application Priority Data

Feb. 1, 2007  (JP) ................... 2007-022915
Oct. 5, 2007  (JP) ................... 2007-261656

(51) Int. Cl.
*H01M 2/36* (2006.01)

(52) U.S. Cl. ........ 429/454; 429/456; 429/458; 429/459; 429/513

(58) Field of Classification Search ........ 429/434, 429/450, 452, 454–459, 462, 467, 505, 512, 429/513
See application file for complete search history.

(56) References Cited

U.S. PATENT DOCUMENTS

| | | | | |
|---|---|---|---|---|
| 3,982,961 A * | 9/1976 | Grasso | ........................ | 429/415 |
| 5,486,430 A * | 1/1996 | Gorbell et al. | ................ | 429/434 |
| 5,773,160 A * | 6/1998 | Wilkinson et al. | ............ | 429/434 |
| 6,159,629 A * | 12/2000 | Gibb et al. | ..................... | 429/434 |
| 6,344,290 B1 | 2/2002 | Bossel | | |
| 6,500,578 B1 * | 12/2002 | Ong et al. | ..................... | 429/459 |
| 6,677,069 B1 * | 1/2004 | Piascik et al. | ................. | 429/459 |
| 2004/0247987 A1* | 12/2004 | Izumi et al. | ..................... | 429/38 |
| 2006/0024534 A1 | 2/2006 | Nakajima et al. | | |
| 2007/0178362 A1* | 8/2007 | Miyazaki | ........................ | 429/38 |
| 2008/0096071 A1* | 4/2008 | Keretli et al. | ................... | 429/26 |

FOREIGN PATENT DOCUMENTS

EP    1 788 656 A1    5/2007
(Continued)

*Primary Examiner* — Joseph Drodge
(74) *Attorney, Agent, or Firm* — Foley & Lardner LLP

(57) ABSTRACT

A fuel cell (A1) includes a cell stack (B) and a casing (210) for housing the cell stack (B), and is supplied with two reactant gases flowing separately from each other. The cell stack (B) includes a plurality of solid electrolyte fuel cell units (200) stacked on one another with inter-unit spaces provided therebetween. One of the reactant gases is supplied to the inter-unit spaces and used for power generation. The casing (210) includes a peripheral wall (222) surrounding the cell stack (B). The peripheral wall (222) is provided with at least one gas inlet opening (223) for introducing the one of the reactant gases into the inter-unit spaces and at least one gas outlet opening (224) for discharging the introduced reactant gas, wherein total opening width dimension of the gas inlet opening (223) is greater than total opening width dimension of the gas outlet opening (224).

19 Claims, 25 Drawing Sheets

FOREIGN PATENT DOCUMENTS

| | | |
|---|---|---|
| JP | 2004-207028 A | 7/2004 |
| WO | WO 2004/059771 A2 | 7/2004 |
| WO | WO 2005/109557 A1 | 11/2005 |
| WO | WO 2005/122314 A2 | 12/2005 |
| WO | WO 2006/043729 A2 | 4/2006 |
| WO | WO 2006/067971 A2 | 6/2006 |

* cited by examiner

FUEL CELL

TECHNICAL FIELD

The present invention relates to a fuel cell including a casing that houses a stack-structured member having multiple solid electrolyte fuel cell units stacked therein.

BACKGROUND ART

U.S. Pat. No. 6,344,290 discloses a fuel cell formed by alternately stacking multiple discoid cell plates and discoid separator plates. A fuel gas inlet hole and an air inlet hole are formed on a central part of each of the cell plates and the separator plates.

According to this fuel cell, two gases of the fuel gas and the air are supplied from the respective central parts of the cell plates and the separator plates, and are discharged from outer peripheral portions thereof. Therefore, it is not possible to collect unburned gas, and as a consequence, fuel utilization efficiency drops when gas flows fluctuate in a transient operating condition or the like. Moreover, unstable combustion at the peripheral portion brings about local thermal stress to the individual cells whereby the individual cells may be damaged.

As a fuel cell for resolving such a risk of damage, Japanese Patent Application Laid-open Publication No. 2004-207028 discloses a fuel cell with a stack-structured member housed in a casing. The stack-structured member includes multiple solid electrolyte fuel cell units that are stacked on one another with current collectors interposed therebetween. Each of the solid electrolyte fuel cell units is formed by joining an outer peripheral portion of a cell plate for holding a unit cell and an outer peripheral portion of a separator plate. Inlet holes for one of a fuel gas and air are provided on respective central parts of the cell plate and the separator plate, thereby forming a central gas passage. The casing is provided with a gas inlet opening and a gas outlet opening through which the other one of the fuel gas and the air is supplied.

DISCLOSURE OF THE INVENTION

In this fuel cell, the current collector is disposed between the mutually adjacent solid electrolyte fuel cell units to be in contact with the unit cell. Accordingly, it is possible to extract generated power efficiently.

However, in a layer where the current collector is located between the solid electrolyte fuel cell units, it is difficult to distribute the reactant gas uniformly in that layer. In a case where an electrode of the unit cell is extended inward close to the central gas passage in order to increase output density of the fuel cell, the reactant gas does not flow smoothly into a wake region downstream the central gas passage. Accordingly, there is a risk that power may not be sufficiently generated from that region.

The stack-structured member of the fuel cell is formed by connecting the central parts of the multiple stacked solid electrolyte fuel cell units. Since the outer peripheral portions of the respective fuel cell units are formed as free ends, a large thermal stress is hardly generated therein.

However, in a case where, for example, the fuel cell is mounted on an automobile, a large amount of a heated gas or a gas for power generation is introduced to one of the reactant gases in order for starting-up rapidly or for dealing with abrupt load fluctuation. Accordingly, there is a possibility that a local temperature change in the vicinity of the gas inlet opening may cause reduction in thermal shock resistance.

Therefore, it is an object of the present invention to provide a fuel cell, which is capable of drastically improving an in-layer flow rate distribution property of a reactant gas flowing in a layer between stacked solid electrolyte fuel cell units, and as a consequence, capable of obtaining the output of generated power efficiently as well as improving thermal shock resistance at the time of operation start-up or load fluctuation associated with an ability to equalize in-plane temperature distribution on the layer between the units at the time of stationary power generation.

An aspect of the present invention is a fuel cell which is supplied with two reactant gases flowing separately from each other and generates electric power therefrom, the fuel cell comprising: a stack-structured member comprising a plurality of solid electrolyte fuel cell units stacked on one another in a stacking direction, wherein inter-unit spaces are provided between the respective fuel cell units and one of the two reactant gases is supplied to the respective inter-unit spaces and used for the power generation; and a casing for housing the stack-structured member including a peripheral wall surrounding the stack-structured member, the peripheral wall being provided with at least one gas inlet opening for introducing the one of the reactant gases into the inter-unit spaces and at least one gas outlet opening for discharging the introduced one of the reactant gases, wherein total opening width dimension of the gas inlet opening is greater than total opening width dimension of the gas outlet opening.

BRIEF DESCRIPTION OF THE DRAWINGS

FIGS. 6A and 6B show a fuel cell according to a second embodiment of the present invention, in which FIG. 6A is a plan sectional view of the fuel cell and FIG. 6B is a cross-sectional taken along the VIB-VIB line in FIG. 6A.

FIGS. 8A and 8B show the fuel cell according to the second embodiment of the present invention, in which FIG. 8A is an exploded perspective view of the fuel cell and FIG. 8B is a partial cross-sectional view of a gas outlet opening thereof.

FIGS. 9A and 9B show a solid electrolyte fuel cell unit, in which FIG. 9A is an exploded perspective view of the fuel cell unit and FIG. 9B is an external perspective view of the fuel cell unit.

FIGS. 10A and 10B show examples of a gas flow resistor, in which FIGS. 10A and 10B are partial cross-sectional views of gas outlet openings provided with gas flow resistors of other examples.

FIGS. 11A and 11B show more examples of the gas flow resistor, in which FIG. 11A is a partial cross-sectional view of a gas outlet opening provided with a gas flow resistor of another example and FIG. 11B is an external perspective view of a fuel cell provided with a gas flow resistor of still another example.

BEST MODES FOR CARRYING OUT THE INVENTION

<First Embodiment>

Figure 1:
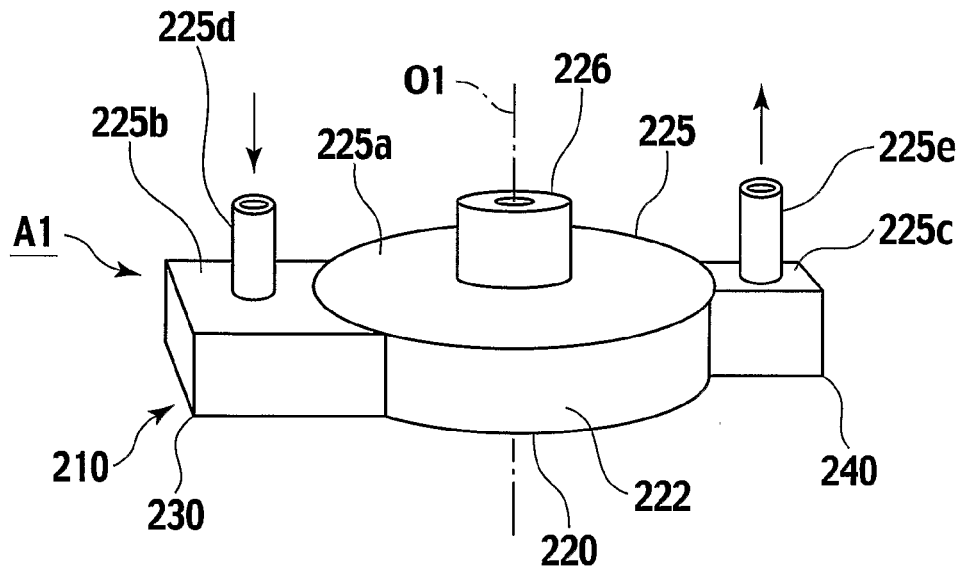
FIG. 1 is an external perspective view of a fuel cell according to a first embodiment of the present invention.
Figure 2:
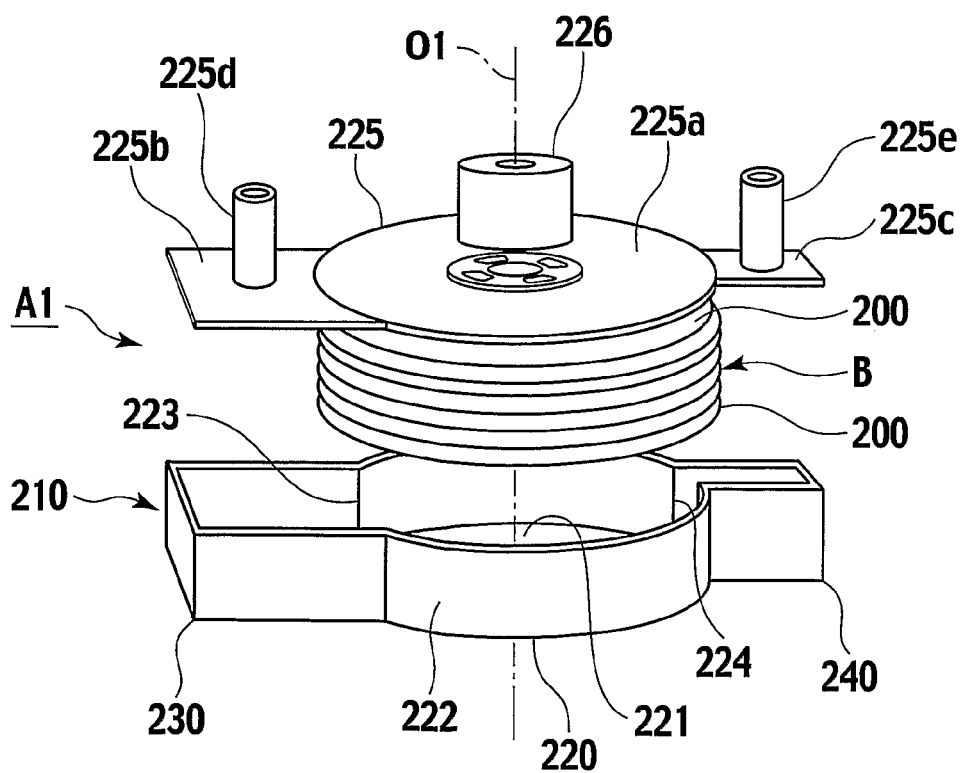
FIG. 2 is an exploded perspective view of the fuel cell in FIG. 1.

A fuel cell A1 according to a first embodiment of the present invention will be described in detail with reference to FIG. 1 to FIG. 5.

The fuel cell A1 includes a stack-structured member B and a casing 210 for housing the stack-structured member (hereinafter simply referred to as a "cell stack") B. Two kinds of reactant gases flow separately from each other inside the cell stack B and inside the casing 210. The fuel cell A1 generates power by receiving the supply of these reactant gases.

The cell stack B includes multiple solid electrolyte fuel cell units 200 which are stacked in a stacking direction while providing inter-unit spaces S between the respective units.

Here, the expression "to stack" means to stack the multiple solid electrolyte fuel cell units (hereinafter simply referred to as "cell units") 200 while providing the inter-unit spaces S between the respective units.

The "inter-unit spaceS" is provided to have one reactant gas out of the two kinds of reactant gases flowing between the mutually adjacent cell units 200. The one of the reactant gases supplied to the inter-unit space S is used for power generation by the fuel cell A1. The "inter-unit space S" includes inter-unit spaces having the same dimensions or inter-unit spaces having systematically different dimensions.

The "two kinds of reactant gases" mean air and a fuel gas. In this respect, in the following description, the one reactant gas means the air and the other reactant gas means the fuel gas. However, it is also possible to define the fuel gas as the one reactant gas and the air as the other reactant gas instead.

In this embodiment, the one reactant gas is flowing inside the casing 210 and the other reactant gas is flowing inside the cell stack B, and both of the reactant gases flow separately from each other.

The casing 210 is formed of a plate material that is made of stainless steel (SUS430, JIS) having a thickness of about 0.5 mm. The casing 210 includes a casing body 220 that surrounds the cell stack B, and a gas introduction portion 230 and a gas discharge portion 240 which are provided in a protruding manner on mutually opposite side surfaces of the casing body 220.

The casing body 220 includes a bottom plate 221 having a circular shape in a plan view and covering one end side (a lower end side) in the stacking direction of the cell stack B, a peripheral wall 222 extending upward in the stacking direction from a peripheral portion of the bottom plate 221 along a side surface of the cell stack B and surrounding the side surface of the cell stack B, and an upper plate 225 being welded over the entire periphery onto an upper end edge of the peripheral wall 222 and covering the other end side (an upper end side) in the stacking direction of the cell stack B so as to secure airtightness.

The peripheral wall 222 includes a gas inlet opening 223 for introducing the one reactant gas into the casing body 220 in order to supply the one reactant gas to the inter-unit spaces S of the cell stack B, and a gas outlet opening 224 for discharging the one reactant gas that is introduced into the casing body 220. The gas inlet opening 223 and the gas outlet opening 224 are respectively formed on mutually opposite side surfaces of the peripheral wall 222 so that the cell stack B can be located between the gas inlet opening 223 and the gas outlet opening 224.

In this embodiment, the expression "formed on mutually opposite side surfaces" means to have a center O3 in a width direction (a midpoint of an opening width dimension W1) of the gas inlet opening 223 and a center O4 in a width direction (a midpoint of an opening width dimension W2) of the gas outlet opening 224 located on a straight line (a diametric line) O2 which is orthogonal to a central axis line O1 of abutting portions 261 and 271 (to be described later) of the cell units 200. However, the present invention is not limited only to this configuration.

The "width direction" of an opening means a direction along the peripheral wall 222 of the casing body 220 in a cross section perpendicular to the stacking direction of the cell stack B. In a case where the peripheral wall 222 has a cylindrical shape, the "width direction" corresponds to the circumferential direction thereof.

The "opening width dimension" is defined as a length of an opening (either the gas inlet opening 223 or the gas outlet opening 224) along the peripheral wall 222 in the cross section perpendicular to the stacking direction of the cell stack B.

In this embodiment, the gas inlet opening 223 and the gas outlet opening 224 have the same opening height H. The opening width dimension W1 of the gas inlet opening 223 is constant over the opening height H thereof. The opening width dimension W2 of the gas outlet opening 224 is also constant over the opening height H thereof.

Moreover, in this embodiment, the opening width dimension W1 of the gas inlet opening 223 is set at least twice or longer than a difference between a radius D1/2 of the cell unit 200 and a radius D2/2 of the abutting portions 261 and 271 (W1≧D1-D2). In this way, the uniformity of in-plane temperature distribution is improved while reducing a pump loss because a pressure loss at the gas inlet opening 223 is decreased.

The gas introduction portion 230 is disposed in a protruding manner in a position outside the peripheral wall 222 corresponding to the gas inlet opening 223 and has a rectangular solid shape. Meanwhile, the gas discharge portion 240 is disposed in a protruding manner in a position outside the peripheral wall 222 corresponding to the gas outlet opening 224 and has a rectangular solid shape with a smaller volume than the gas introduction portion 230.

The upper plate 225 is formed integrally by joining a main plate 225a constituting an upper end portion of the casing body 220 and sub-plates 225b and 225c constituting upper end portions of the gas introduction portion 230 and the gas discharge portion 240. Peripheral portions of the upper plate 225 are welded to the peripheral wall 222 of the casing body 220, and lateral sidewalls that define the gas introduction portion 230 and the gas discharge portion 240.

A gas-introducing conduit 225d for introducing the one reactant gas from a reactant gas supply system is provided in an upright manner on an upper surface of the sub-plate 225b. Meanwhile, a gas-discharge conduit 225e for discharging the one reactant gas introduced to the casing body 220 is provided in an upright manner on an upper surface of the sub-plate 225c.

A central gas duct 226 for introducing and discharging the other reactant gas to and from the cell units 200 is connected to a central portion on an upper surface of the main plate 225a. The central gas duct 226 is disposed coaxially with the central axis line O1 of the cell stack B.

Each of the cell units 200 includes: a solid electrolyte cell (hereinafter also referred to as a "unit cell") 250; a cell plate 260 disposed with the unit cell 250; a separator plate 270 for defining a space K of the cell unit 200 between the cell plate 260 and the separator 270 in cooperation with the cell plate 260; an in-unit current collector 280 housed in the space K; and a flow passage-forming member 290. Accordingly, the cell unit 200 has a hollow-disk shape.

The cell plate 260 includes a circular substrate 262, a cylindrical abutting portion 261 projected downward from a central portion of the circular substrate 262, and a peripheral wall 263 extending upward from a peripheral edge portion of the circular substrate 262. The abutting portion 261 has a height for defining the inter-unit space S in corporation with an abutting portion 271 of the separator plate 270 of another cell unit 200 adjacent thereto.

A gas inflow hole 291 and a gas outflow hole 292 are formed on the flow passage-forming member 290, and through holes 264 and 265 having the same diameters as the gas inflow hole 291 and the gas outflow hole 292 are formed on the abutting portion 261 in positions corresponding to the gas inflow hole 291 and the gas outflow hole 292.

The solid electrolyte cell 250 includes an electrolyte, as well as an anode electrode (a fuel electrode) and a cathode electrode (an air electrode) respectively provided on both of vertical sides of the electrolyte. The solid electrolyte cell 250 is formed into a circular plate shape having the central axis line O1 as the center axis thereof.

The separator plate 270 includes a circular substrate 272, a cylindrical abutting portion 271 projected upward from a central portion of the circular substrate 272, and a peripheral wall 273 extending downward from a peripheral edge portion of the circular substrate 272. The abutting portion 271 has a height for defining the inter-unit space S in corporation with the abutting portion 261 of the cell plate 260 of the adjacent cell unit 200.

Through holes 274 and 275 having the same diameters as the gas inflow hole 291 and the gas outflow hole 292 are also formed on the abutting portion 271 in positions corresponding to the gas inflow hole 291 and the gas outflow hole 292.

When stacking the cell units 200 having the above-described configuration, the abutting portion 261 of the cell plate 260 abuts on the abutting portion 271 of the separator plate 270. In this way, the inter-unit space S is defined between the adjacent cell units 200.

An ex-unit current collector 300 is disposed in each of the inter-unit spaces S between the cell units. The ex-unit current collector 300 is, for example, a metal mesh made of Inconel (registered trademark) formed into an annular shape, with a peripheral portion thereof joined to either the cell plate 260 or the separator plate 270 by means of laser welding or the like.

A state of flow of the one reactant gas in this embodiment will be described below.

The one reactant gas flowing into the casing body through the gas inlet opening 223 flows in the respective inter-unit spaces S between the cell units 200 toward the gas outlet opening 224, and is discharged from the casing body 220 through the gas outlet opening 224.

In this embodiment, a total opening width dimension of the gas inlet opening 223 is set greater than a total opening width dimension of the gas outlet opening 224.

The "total opening width dimension" is defined as a total value of the "opening width dimensions". For example, the total opening width dimension of the gas inlet opening 223 becomes equal to the opening width dimension thereof when only one gas inlet opening 223 is provided, or becomes equal to the total value of the opening width dimensions when multiple gas inlet openings 223 are provided. The same applies to the total opening width dimension of the gas outlet openings 224.

This configuration suppresses flow velocity of the one reactant gas at the gas inlet opening 223. Accordingly, it is possible to prevent a local and abrupt temperature change when introducing a heated gas for rapid start-up or at the time of load fluctuation, improving thermal shock resistance.

Moreover, it is possible to increase a pressure loss of the one reactant gas at the gas outlet opening as compared to a pressure loss at the gas inlet opening.

Further, it is possible to reduce a difference between a flow passage length from the gas inlet opening 223 to the gas outlet opening 224 through the vicinity of the abutting portion (the central portion) of the cell stack B and a flow passage length from the gas inlet opening 223 to the gas outlet opening 224 through the vicinity of the outer section of the cell stack.

In addition thereto, the one reactant gas is uniformly distributed over the entire cross-section perpendicular to the stacking direction of the layer between the cell units, whereby in-plane temperature distribution of the layer between the cell units is equalized over the entire cross-section perpendicular to the stacking direction at the time of stationary power generation.

<Second Embodiment>

Next, a fuel cell A2 according to a second embodiment of the present invention will be described with reference to FIG. 6 to FIG. 9.

The fuel cell A2 includes a cell stack 11 and a casing 10 for housing the cell stack 11. The casing 10 includes a casing body 12 that surrounds the cell stack 11, and a gas introduction portion 12A and a gas discharge portion 12B which are provided in a protruding manner on mutually opposite side surfaces of the casing body 12.

The casing body 12 includes: a bottom plate 12c having a circular shape in a plan view, and covering one end side (a lower end side) in the stacking direction of the cell stack 11; a peripheral wall 12d extending upward in the stacking direction from a peripheral portion of the bottom plate 12c along a side surface of the cell stack 11, and surrounding the side surface of the cell stack 11; and a lid member (an upper plate) 12e being welded over the entire periphery onto an upper end edge of the peripheral wall 12d, and covering the other end side (an upper end side) in the stacking direction of the cell stack 11 so as to secure airtightness.

In the fuel cell A2, a gas flow-regulating member 16 is disposed in a gap S2 between an inner circumference of the casing body 12 and the cell stack 11. As will be described later, the gas flow-regulating member 16 has a flow resistance enough to cause/direct the one reactant gas introduced from a gas inlet opening 12a to flow toward a gas outlet opening 12b through an ex-unit current collectors 15.

The peripheral wall 12d includes the gas inlet opening 12a for introducing the one reactant gas into the casing body 12 in order to supply the one reactant gas to the inter-unit spaces S1 of the cell stack 11, and the gas outlet opening 12b for discharging the one reactant gas that is introduced into the casing body 12. The gas inlet opening 12a and the gas outlet opening 12b are respectively formed on mutually opposite side surfaces of the peripheral wall 12d so that the cell stack 11 can be located between the gas inlet opening 12a and the gas outlet opening 12b.

The gas introduction portion 12A is disposed in a protruding manner in a position outside the peripheral wall 12d corresponding to the gas inlet opening 12a, and has a rectangular solid shape. Meanwhile, the gas discharge portion 12B is disposed in a protruding manner in a position outside the peripheral wall 12d corresponding to the gas outlet opening 12b, and has a rectangular solid shape with a smaller volume than the gas introduction portion 12A.

A central gas duct 13 for introducing and discharging the other reactant gas (the fuel gas) to and from the cell units 1 is connected to the center of the cell stack 11.

As shown in FIGS. 6 to 9, each of the cell units 1 includes: a unit cell 6; a cell plate 2 for loading the unit cell 6; a separator plate 3 for defining a space K between the cell plate 2 and the separator 3 in cooperation with the cell plate 2; an in-unit current collector 4 housed in the space K; and a flow passage-forming member 5. Accordingly, the cell unit 1 has a hollow-disk shape.

The cell plate 2 is made of metal and formed into a circular thin plate shape. A circular convex step portion (an abutting portion) 23, which functions as a spacer as will be described later, is formed on a central part of the cell plate 2 to project downward coaxially with an outer peripheral edge portion thereof. The circular convex step portion 23 is provided with a gas inlet hole 21 and a gas outlet hole 22.

The separator 3 is made of metal and formed into a circular thin plate shape as similar to the cell plate 2. A circular convex step portion (an abutting portion) 33, which functions as a spacer as will be described later, is formed on a central part of the separator plate 3 to project upward coaxially with an outer peripheral edge portion thereof. The circular convex step portion 33 is provided with a gas inlet hole 31 and a gas outlet hole 32 in positions respectively corresponding to the gas inlet hole 21 and the gas outlet hole 22 of the cell plate 2.

The circular convex step portions 23 and 33 of the cell plate 2 and the separator plate 3 are respectively formed by press molding, for example, and are formed coaxially with a central axis line O1 of the cell stack 11.

An annular step portion 24 for forming the space K is formed on the outer peripheral edge portion of the cell plate 2 to extend upward coaxially with the circular convex step portion 23 by press molding.

An annular step portion 34 for forming the space K is also formed on the outer peripheral edge portion of the separator plate 3 to extend downward coaxially with the circular convex step portion 33 by press molding.

The respective outer peripheral edge portions of the cell plate 2 and the separator plate 3 are joined together in a mutually opposed state.

The unit cell 6 is formed into a donut shape. An inner peripheral edge portion of the unit cell 6 is joined to an inner circular plate portion of the cell plate 2 where the circular convex step portion 23 is formed, and an outer peripheral edge portion of the unit cell 6 is joined to an outside ring portion of the cell plate 2 where the annular step portion 24 is formed. The unit cell 6 may be any of an electrolyte-supported cell, an electrode-supported cell, and a porous material-supported cell.

The flow passage-forming member 5 is housed in the circular convex step portion 33 of the separator plate 3. The flow passage-forming member 5 forms a passage communicated with the gas inlet hole 31 to guide the fuel gas supplied from the central gas duct 13 to the space K formed between the cell plate 2 and the separator plate 3.

Meanwhile, a flow passage-forming member 5 is housed in the circular convex step portion 23 of the cell plate 2. The flow passage-forming member 5 forms a passage communicated with the gas outlet hole 22 to discharge the fuel gas from the space K to the central gas duct 13.

As will be described later, these flow passage-forming members 5 are attached to each other only by use of a pressure applied to the respective cell units when stacking the cell units 1 to form the cell stack 11.

In this embodiment, a fuel electrode-supported cell having a thickness of 0.8 mm is used as the unit cell 6. The fuel electrode-supported cell includes: a fuel electrode made of nickel/yttria-stabilized zirconia cermet; an electrolyte made of 8-mol % yttria-stabilized zirconia; and an air electrode made of lanthanum strontium manganite.

The cell plate 2 and the separator plate 3 are made of a stainless steel (SUS430) rolled plate having a thickness of 0.1 mm.

This rolled plate is set on a pressing device equipped with a mold made of cemented carbide and SKD11 (JIS G 4404) and subjected to press work while applying a press load of 80 tons, thereby obtaining the cell plate 2 formed into the above-described shape. Thereafter, $BaO-CaO-Al_2O_3-SiO_2$ based glass paste is applied in a thickness of 50 μm on a unit cell attachment portion 25 of the cell plate 2, and then the unit cell 6 is placed on this glass paste and attached thereto at 900° C. for 15 minutes.

The cell plate 2 and the separator plate 3 obtained by the press work and joining of the unit cell 6 have an outside diameter of 125 mm, respectively. The outer peripheral portions of the cell plate 2 and the separator plate 3 are joined together by use of laser welding to form the cell unit 1 having the thickness of 1.5 mm.

Donut-shaped metal mesh made of Inconel is used for the in-unit current collector 4 and the peripheral portion thereof is joined to the cell plate 2 and the separator plate 3 by laser welding.

The flow passage-forming members 5 are also made of a stainless steel (SUS430). The flow passage-forming members 5 are fixed to the cell plate and the separator plate 3 by diffusion bonding in vacuum while setting a bonding temperature equal to or below 1000° C. to avoid deformation at the time of bonding.

Here, it is also possible to carry out bonding by laser welding using YAG laser instead of diffusion bending. Since the cell plate 2 and the separator plate 3 are thin plates, it is possible to bond these plates by irradiating the laser from a front side thereof.

Meanwhile, flow passages on the flow passage-forming members 5 can be formed by etching, grinding or laser processing. The flow passages can also be formed by stacking and bonding an etching component.

In the fuel cell A2 according to this embodiment, a ceramic adhesive mainly containing $Al_2O_3$ is applied on the central part on one side of each of the adjacent cell units 1 when stacking these cell units 1.

The cell stack 11 is manufactured by continuing to stack the cell units 1 until the predetermined number of the cell units 1 are stacked, while locating the central part of the adjacent cell unit 1 on the central part applied with this ceramic adhesive, and performing adhesion baking at 150° C. for 2 hours.

Figure 8A:
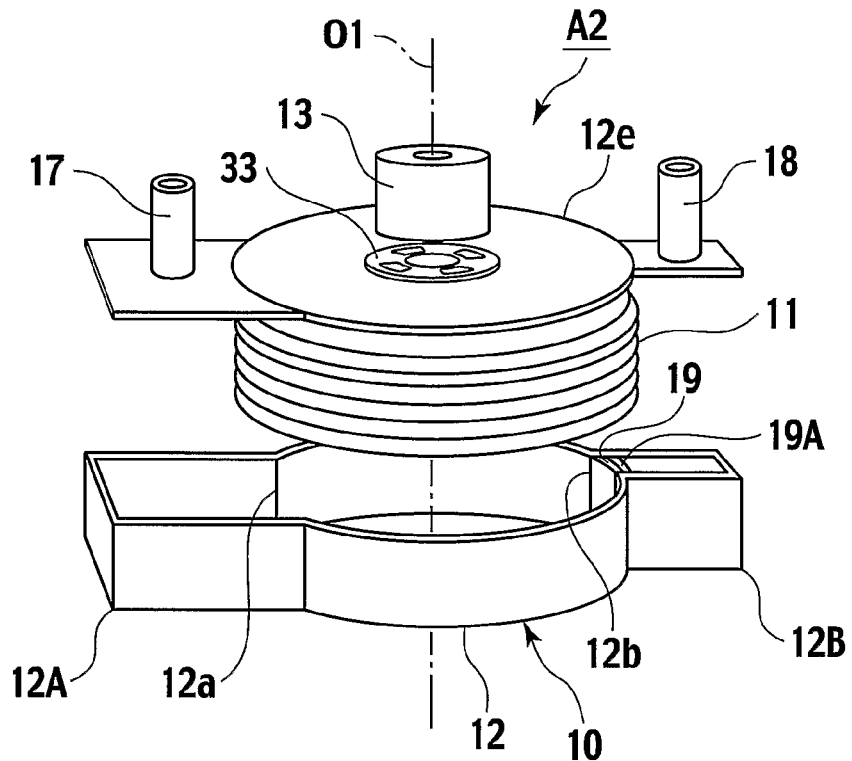
Figure 8B:
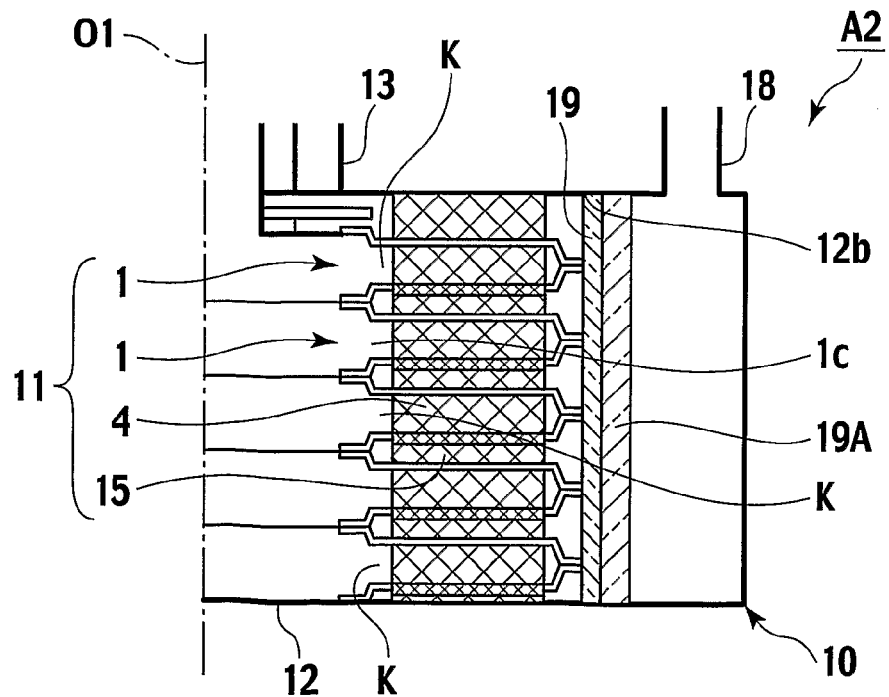
Figure 9A:
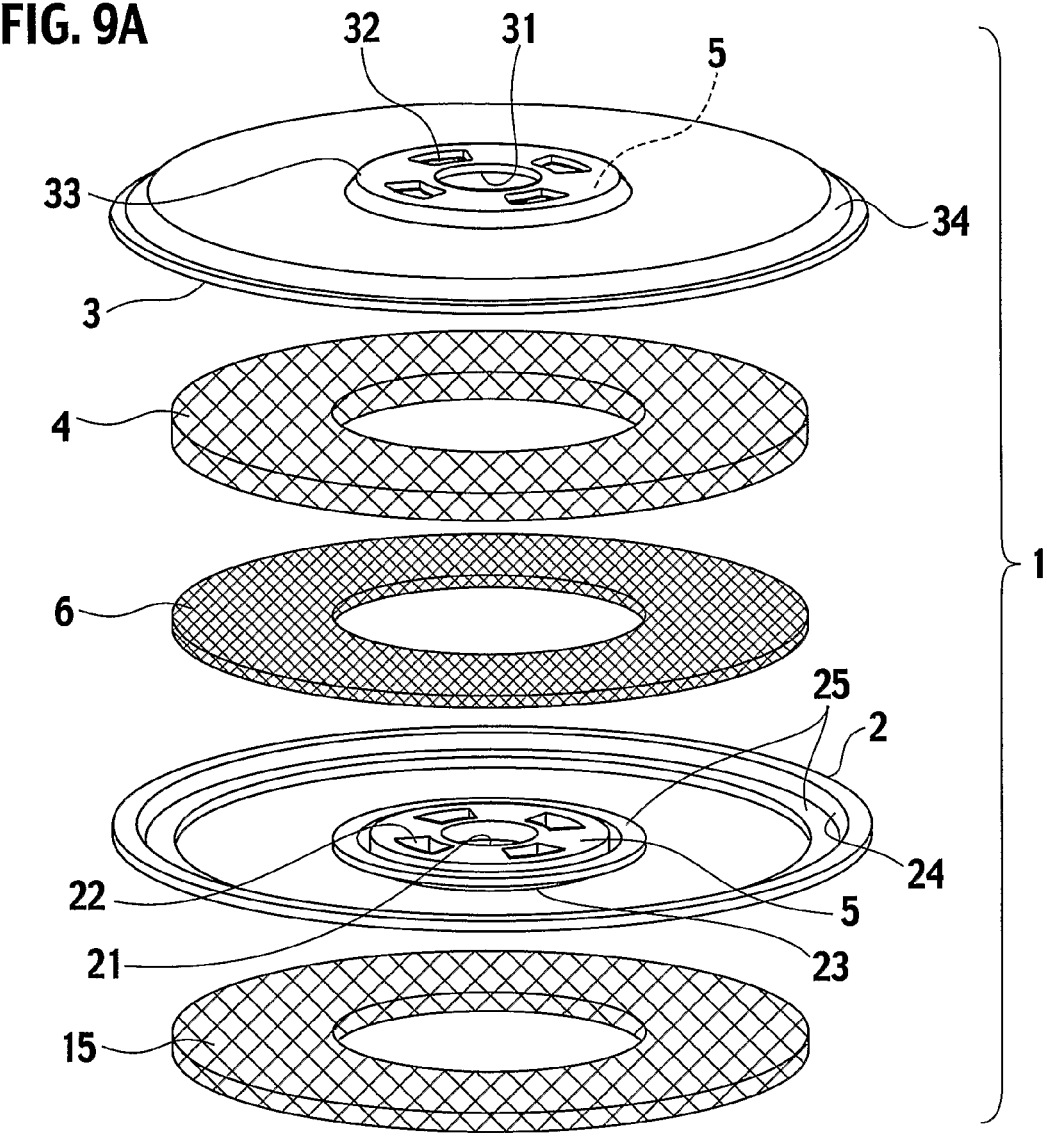
Figure 9B:
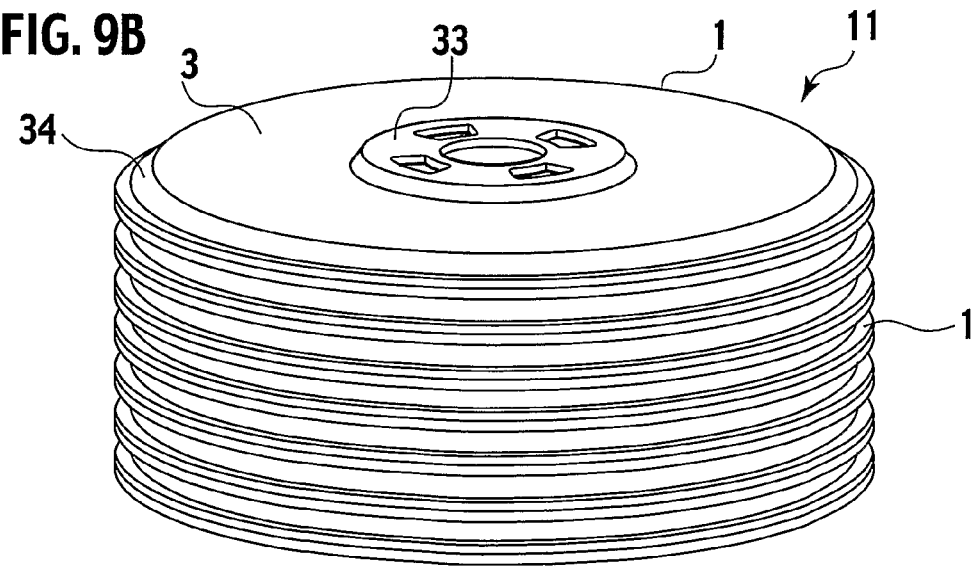

As shown in FIG. 8, the cell stack 11 is housed in the casing 10, i.e. the casing body 12 (a plate thickness of 0.5 mm), made of stainless steel (SUS430) and provided with the gas inlet opening 12a and the gas outlet opening 12b.

Then, the central gas duct 13 is welded and thereby joined to the circular convex step portion 33 of the separator plate 3 of the cell unit 1 located at the top of the cell stack 11, and the lid member 12e is put on this casing body 12 and seams on the respective constituents are joined together by welding.

Further, a gas-introducing conduit 17 and a gas-discharge conduit 18 are respectively welded and thereby joined to a portion covering the gas introduction portion 12A and a portion covering the gas discharge portion 12B of the lid member 12e.

A filler member 16 made of fire-resistant foamed cement that serves as the gas flow-regulating member 16 is provided in the gap S2 between the cell stack 11 and the casing body 12.

The total opening width dimension W1 of the gas inlet opening 12a in the casing body 12 is set greater than the total opening width dimension W2 of the gas outlet opening 12b. The filler member 16 causes the air introduced from the gas inlet opening 12a to flow toward the gas outlet opening 12b through the ex-unit current collectors 15 disposed in the spaces S1 between the cell units 1.

In this embodiment, the filler member 16 is applied on an outer peripheral portion (a side surface) of the cell stack 11 prior to setting the cell stack 11 in the casing body 12. Moreover, before applying the filler member 16, a material mainly containing boron nitride is sprayed over the outer peripheral portion of the cell stack 11 as a mold release agent, thereby allowing a relative movement between the filler member 16 and the cell stack 11.

Moreover, in this embodiment, foam metal 19A is provided to extend across the gas outlet opening 12b on a peripheral wall of the casing body 12. The foam metal 19A is made of stainless steel (SUS310S, JIS) having pore diameters of 10 μm and a thickness of 1 mm and is joined to the peripheral wall around the gas outlet opening 12b by means of spot welding. Glass wool (a gas flow resistor) 19 is attached to a side of the foam metal 19A by use of a ceramic adhesive.

Figure 6A:
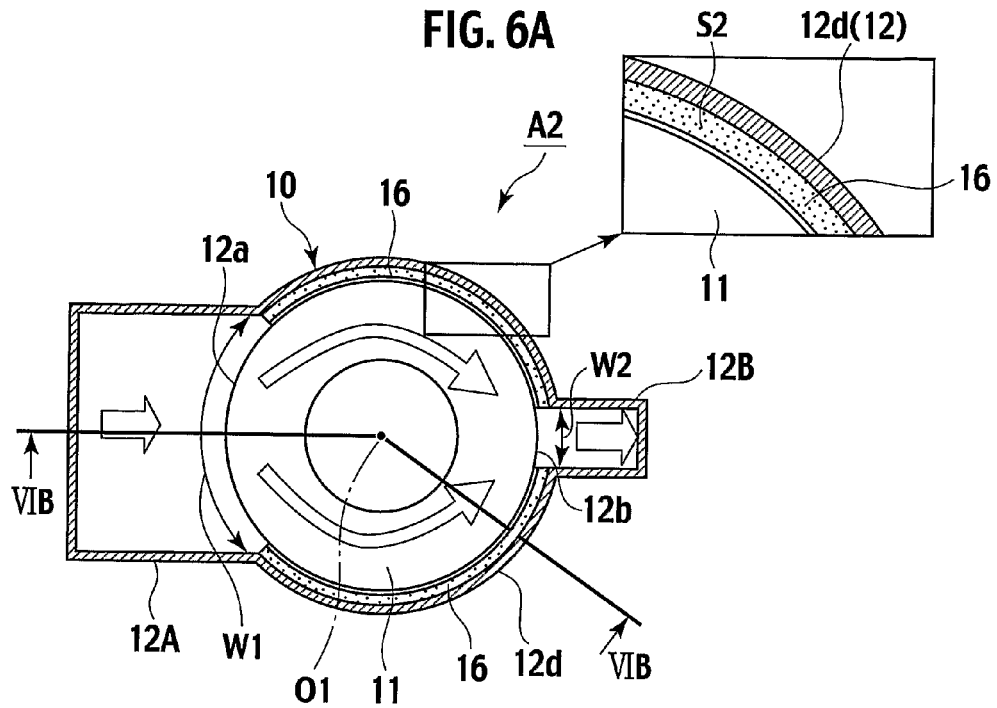
Figure 6B:
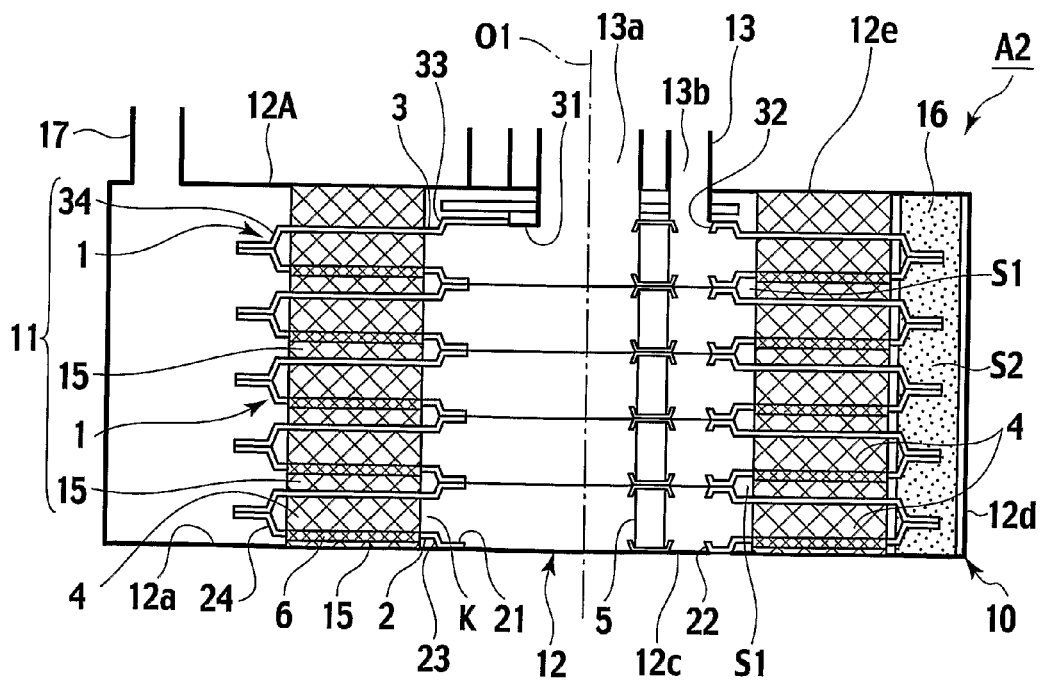
Figure 7:
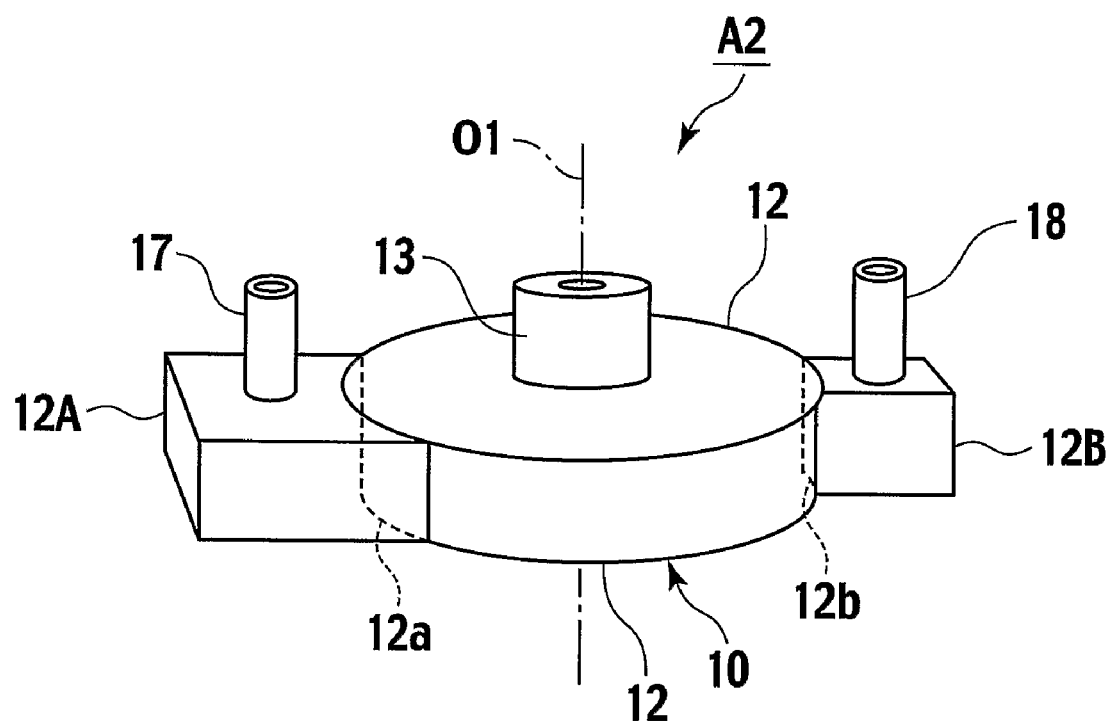
FIG. 7 is an external perspective view of the fuel cell according to the second embodiment shown in FIGS. 6A and 6B.

In this fuel cell A2, when the air is introduced from the gas-introducing conduit 17 to the casing body 12 through the gas inlet opening 12a as shown in FIG. 6A, the introduced air passes the inter-unit spaces between the respective cell units 1 of the cell stack 11, i.e. through the ex-unit current collectors 15 located on a cathode, and is discharged to the gas-discharge conduit 18 through the gas outlet opening 12b.

Meanwhile, the fuel gas is introduced to the respective spaces K formed between the cell plates 2 and the separator plates 3 through the gas introduction portion 13a of the central gas duct 13 and the respective gas inlet holes 21 and 31 of the cell units 1. The introduced fuel gas flows into the spaces K and then discharged through the respective gas outlet holes 22 and 32 and the gas discharge portion 13b of the central gas duct 13.

As described above, in the fuel cell A2, the filler member 16 serving as the gas flow-regulating member is provided in the gap S2 between the cell stack 11 and the inner circumference of the peripheral wall 12d of the casing body 12, and the total opening width dimension W1 of the gas inlet opening 12a in the casing body 12 is set greater than the total opening width dimension W2 of the gas outlet opening 12b.

In this way, the air introduced from the gas inlet opening 12a of the casing body 12 flows more into the inter-unit spaces S1 between the stacked cell units 1, i.e. the layers where the ex-unit current collectors 15 are disposed, than the gap S2 between the casing body 12 and the cell stack 11.

Therefore, an amount of air supply to the unit cells 6 held by the cell plates 2 is significantly increased and sufficient power generation output is obtained.

Moreover, in the fuel cell A2, the air is uniformly distributed over the planes of the respective layers as the air flows more into the layers between the cell units 1. Accordingly, in-plane temperature distribution on the layer between the units is equalized at the time of stationary power generation whereby thermal shock resistance is improved at the time of operation start-up or load fluctuation.

Further, in the fuel cell A2, only the fuel gas is supplied into the spaces K between the cell plates 2 and the separator plates 3 of the cell units 1, separately from the air. Therefore, it is possible to collect unburned fuel gas. Accordingly, fuel utilization is not reduced even when the gas flow fluctuates at the time of a transient operation. In addition, it is possible to reduce a possibility of troubles due to thermal stress locally applied to the unit cell 6.

Furthermore, in the fuel cell A2, the gas flow-regulating member is formed by applying the filler member 16 made of foamed cement on the outer peripheral portion of the cell stack 11. The outer peripheral portion of the cell stack 11 is subjected to a surface treatment in advance by spray-applying the material mainly containing boron nitride and serving as the mold release agent. Accordingly, the filler member 16 is disposed in a predetermined position without being immovably fixed to the cell units 1.

Despite the simplicity of these operations, amounts of gas supplies to the unit cells 6 can be increased efficiently, and the thermal stress to the outer peripheral portions of the cell units 1 at the time of the temperature change is easily released. As a result, it is possible to achieve improvement in the thermal shock resistance and thin profiling of the cell units 1.

Moreover, in the fuel cell A2, the glass wool 19 serving as the gas flow resistor is extended across at the gas outlet opening 12b on the peripheral wall of the casing body 12. Accordingly, a discharge pressure at the entrance side of the gas outlet opening 12b of the casing body 12 is increased and therefore the air is distributed more uniformly over the plane of the layer between the cell units 1.

Although the cell unit 1 includes the cell plate 2 and the separator plate 3 having substantially the same shape, the shapes of these plates are not limited only to this configuration. For example, it is possible to form the cell plate 2 in a form provided with only the circular convex step portion 23, and to set the height of the annular step portion 34 of the separator plate 3 about twice as high as the above-described annular step portion 34.

Meanwhile, in the embodiment described above, the unit cell 6 is formed into the donut shape. However, the shape of the unit cell 6 is not limited to this. It is also possible to dispose two or more unit cells 6 on the cell plate 2 wherein each unit cell 6 is formed into a disk shape with a smaller diameter, or to form the unit cell 6 into a sector shape and fit the unit cell 6 into the attachment portion of the cell plate 2 with a frame.

Moreover, in this embodiment, an upper opening of the casing body 12 for setting the cell stack 11 therein has a circular shape. However, the shape of the opening is not limited only to this. For example, the upper opening may be formed into a hexagonal shape.

Furthermore, in this embodiment, the filler member 16 is provided in the gap between the inner circumference of the peripheral wall 12d of the casing body 12 and the side surface of the cell stack 11 all around the cell stack 11 except the portions corresponding to the gas inlet opening 12a and the gas outlet opening 12b. Instead, it is also possible to provide the filler member 16 only in the vicinity of the gas inlet opening 12a and in the vicinity of the gas outlet opening 12b in the gap between the casing body 12 and the cell stack 11.

Figure 10A:
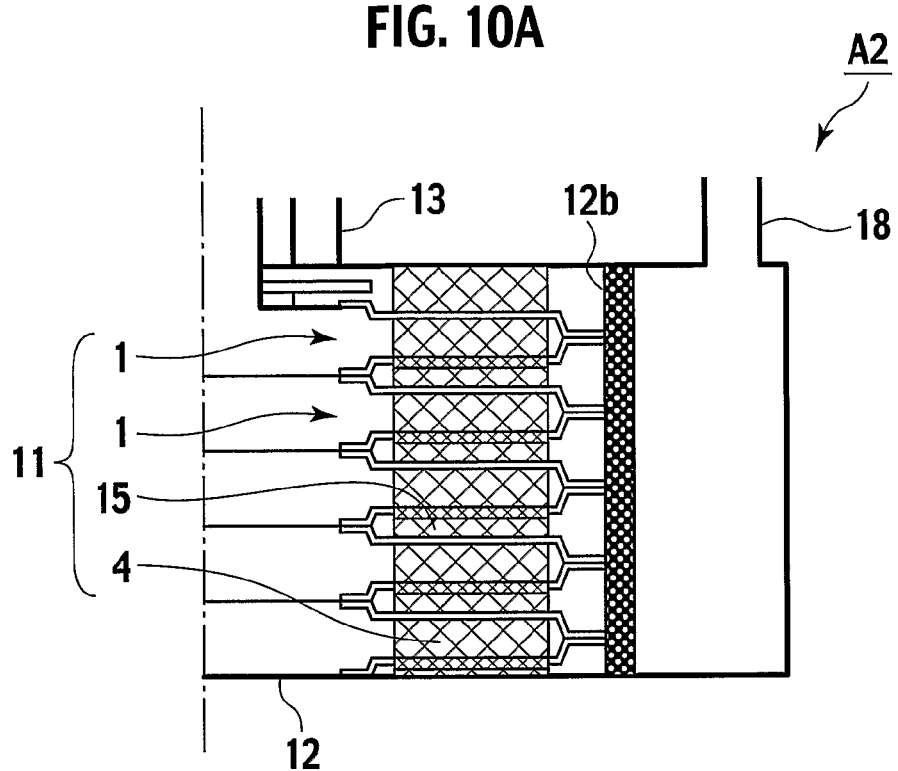
Figure 10B:
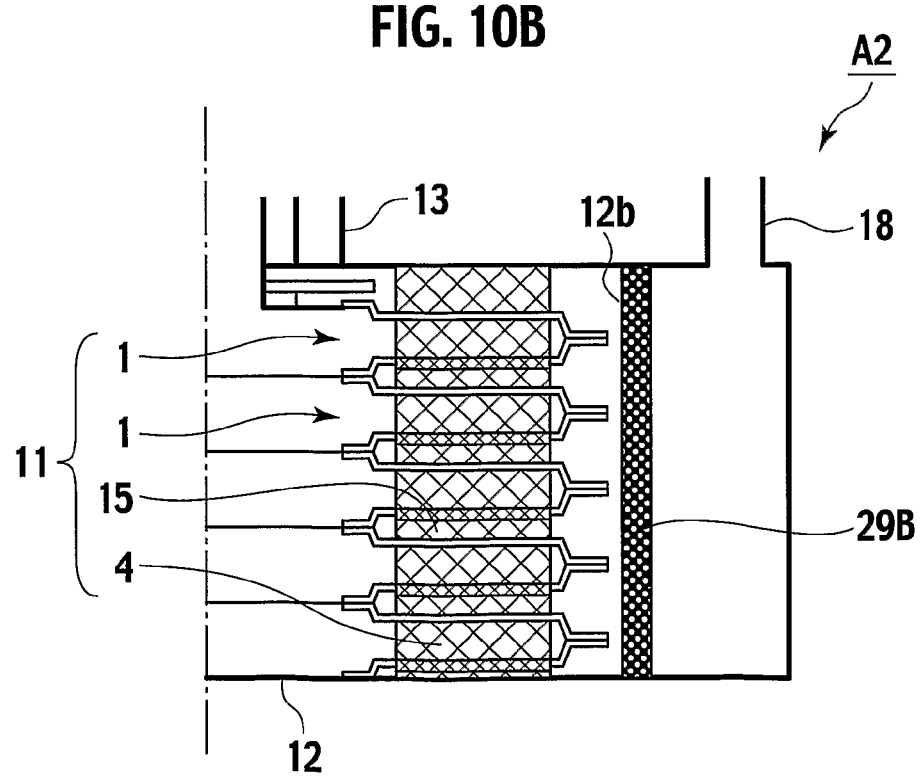

In addition, this embodiment shows the case of: using the glass wool 19 as the gas flow resistor; and fixing this glass wool 19 to the gas outlet opening 12b with the foam metal 19A. However, the gas flow resistor and how to fix the gas flow resistor are not limited only to this. For example, as shown in FIG. 10A, it is also possible to apply a configuration to use a porous ceramic 29A mainly containing alumina as the gas flow resistor, and to fix this porous ceramic 29A to the gas outlet opening 12b by use of a ceramic adhesive. Alternatively, as shown in FIG. 10B, it is also possible to apply a configuration to use a punching board 29B having numerous small holes with a diameter of 0.5 mm and a thickness of 0.6 mm as the gas flow resistor, and to fix this punching board 29B to the gas outlet opening 12b by welding in a position not in contact with the cell stack 11.

Figure 11A:
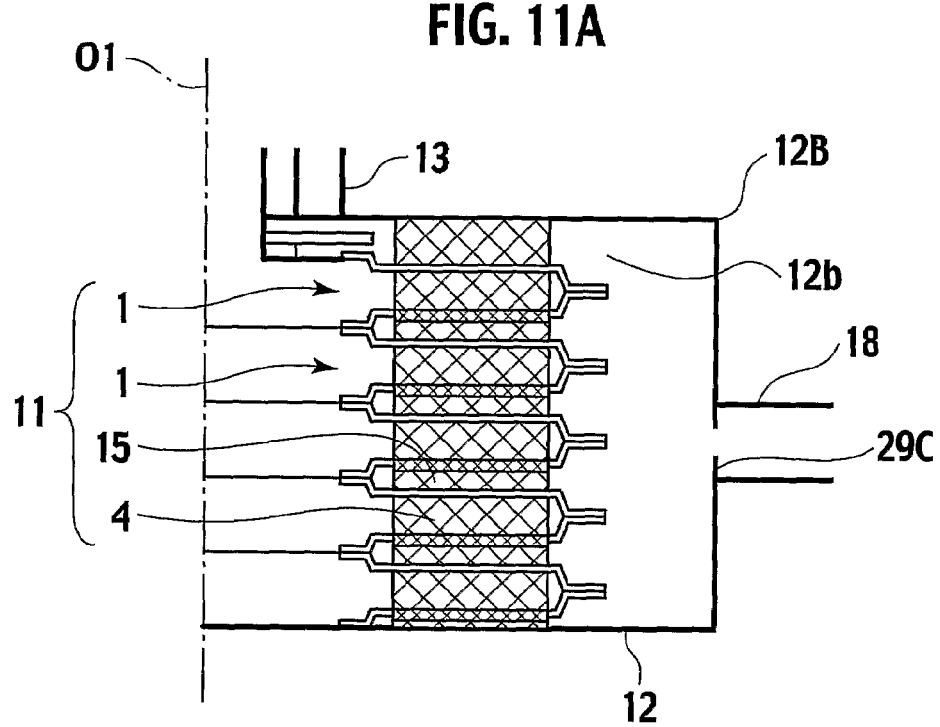
Figure 11B:
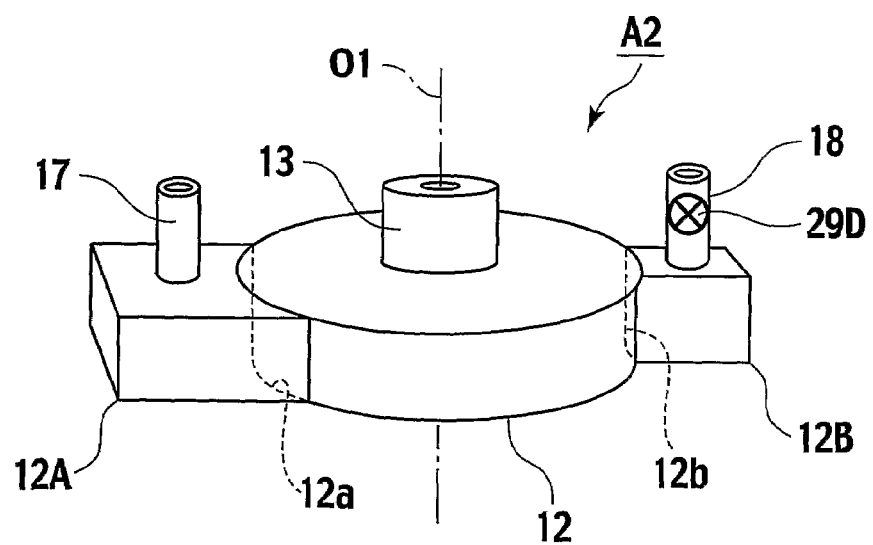

The gas flow resistor for providing a resistance to the airflow is not limited only to one which is provided on the gas outlet opening 12b of the casing body 12. For example, it is also possible to set a minimum cross-sectional area of a gas-discharge conduit connected to the gas outlet opening (a sum of minimum cross-sectional areas of respective gas-discharge conduits in the case of providing multiple gas outlet openings as will be described later) to be equal to or below a cross-sectional area of the gas-discharge conduit (equal to or below the sum of cross-sectional areas of the respective outlet openings in the case of providing multiple gas outlet openings as will be described later). For example, it is possible to provide an orifice 29C, serving as the gas flow resistor, on the gas-discharge conduit 18 connected to the gas outlet opening 12b through the gas discharge portion 12B of the casing 10 as shown in FIG. 11A. Otherwise, it is also possible to provide an electromagnetic valve 29D, serving as the gas flow resistor, on the gas-discharge conduit 18 connected to the gas outlet opening 12b through the gas discharge portion 12B of the casing 10 as shown in FIG. 11B.

<Third Embodiment>

Figure 12:
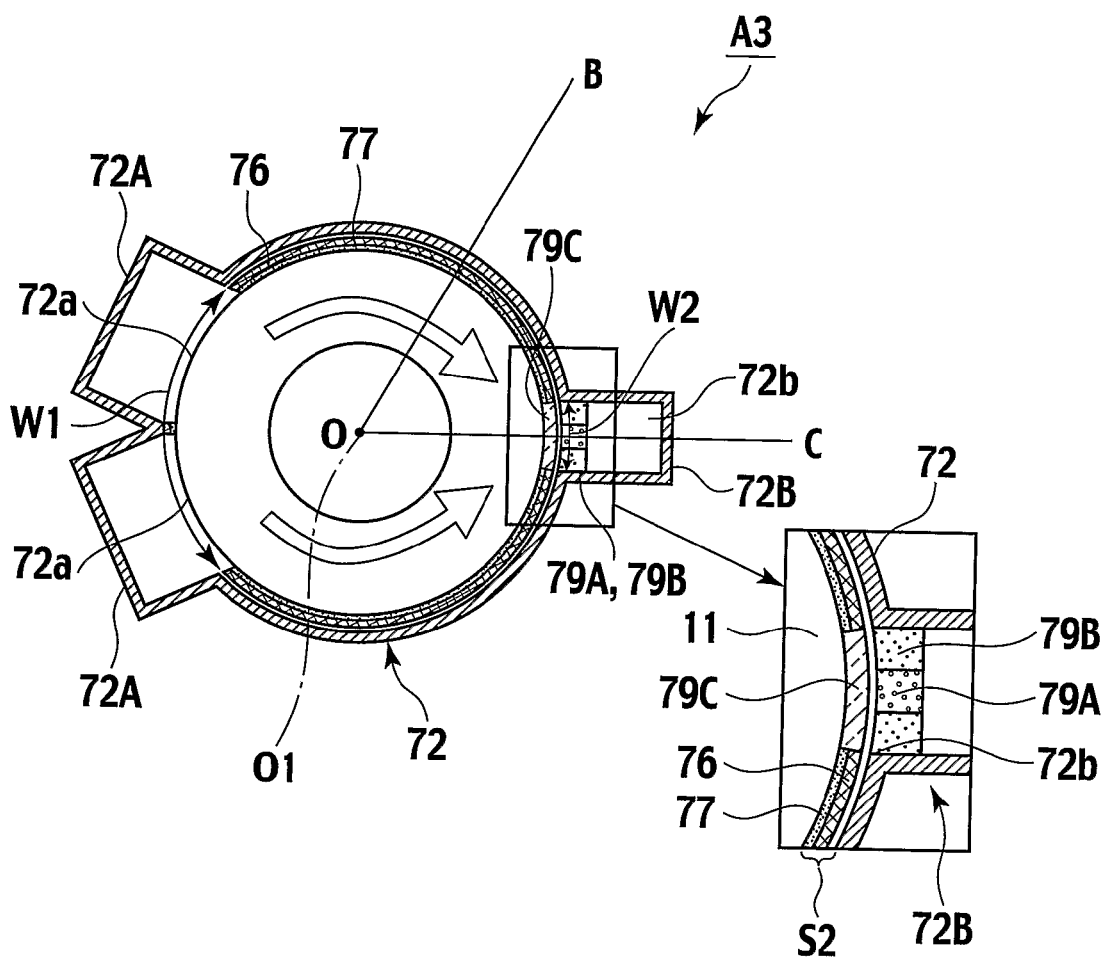
FIG. 12 is a plan explanatory view showing a fuel cell according to a third embodiment of the present invention.
Figure 13:
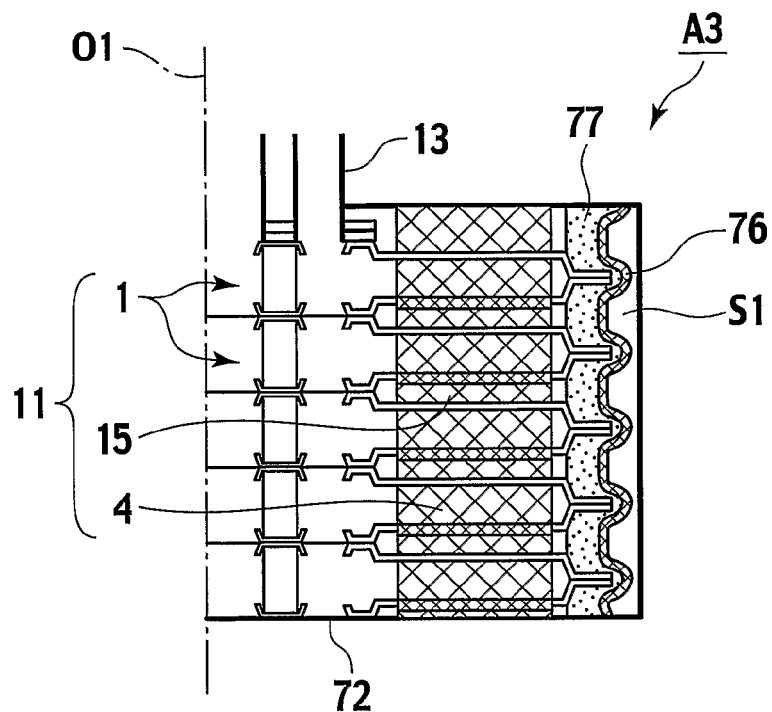
FIG. 13 is a cross-sectional view taken along the O-B line shown in FIG. 12.
Figure 14:
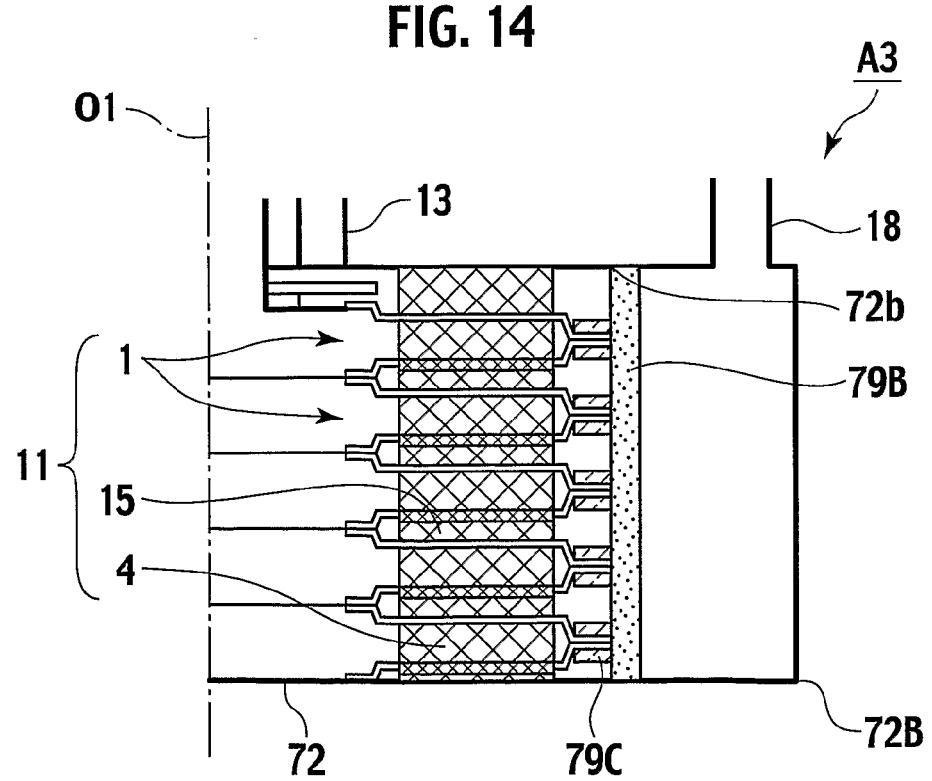
FIG. 14 is a cross-sectional view taken along the O-C line shown in FIG. 12.

FIG. 12 to FIG. 14 show a fuel cell according to a third embodiment of the present invention.

A fuel cell A3 according to this embodiment has a configuration to provide a casing body 72 (a plate thickness of 0.5 mm) made of stainless steel (SUS310, JIS) with two gas inlet openings 72a and one gas outlet opening 72b. The total opening width dimension W1 of the two gas inlet openings 72a is set greater than the total opening width dimension W2 of the gas outlet opening 72b.

Two gas introduction portions 72A and one gas discharge portion 72B are provided in a protruding manner beside the casing body 72. Configurations of the respective gas introduction portions 72A and the gas discharge portion 72B are similar to those in the above-described embodiments.

In this embodiment, a gas flow-regulating member is formed of a ceramic sheet 77 attached to an inner side surface of a metal corrugated plate 76. As shown in FIG. 13, the metal corrugated plate 76 has a plate thickness of 0.1 mm which is formed into corrugation so as to fit a shape of a side surface of the cell stack 11. The corrugation has the same pitch as inter-unit spaces between the multiple cell units 1 constituting the cell stack 11.

This gas flow-regulating member is attached to the side surface of the cell stack 11, in which the outer peripheral portions of the respective cell units 1 are fitted into valleys of the corrugation on the inner side surface of the metal corrugated plate 76 with the ceramic sheet 77 interposed therebetween, and is fixed to the casing body 72 by means of spot welding.

Moreover, in this embodiment, a gas flow resistor is formed by bonding foam metal 79B to both ends in the width direction of a high-porosity punching board 79A by means of seam welding as shown in FIGS. 12 and 14. The foam metal 79B is made of low-porosity stainless steel (SUS310S) having a pore diameter of 10 μm, pore percentage of 30%, and a thickness of 1 mm. The high-porosity punching board 79A has a pore diameter of 100 μm, pore percentage of 50%, and a thickness of 1 mm.

This gas flow resistor is fixed to a wall around the gas outlet opening 72 by means of laser welding. At a portion of the side surface of the cell stack 11 which is facing to the gas outlet opening 72b of the casing body 72, glass coating 79C is provided. The glass coating 79C is formed on the outer peripheral portions of the respective cell units by applying and baking.

In the fuel cell A3 of this embodiment, the gas flow-regulating member including the metal corrugated plate 76 and the ceramic sheet 77 is disposed in the gap S2 between the cell stack 11 and the case body 72. In addition, the total opening width dimension W1 of the gas inlet openings 72a of the casing body 72 is set greater than the total opening width dimension W2 of the gas outlet opening 72b.

In this way, the air introduced from the gas inlet openings 72a of the casing body 72 flows more into the inter-unit spaces S1 between the stacked cell units 1, i.e. into the layers where the ex-unit current collectors 15 are disposed, than the gap S2 between the casing body 72 and the cell stack 11.

Therefore, the amount of air supply to the unit cells 6 held by the cell plates 2 is significantly increased, and sufficient power generation output is obtained.

Moreover, in the fuel cell A3, the air is uniformly distributed on the planes of the respective layers, as the air flows more to the layers between the cell units 1. Accordingly, in-plane temperature distribution on the layer between the units is equalized at the time of stationary power generation, whereby thermal shock resistance is improved at the time of operation start-up or load fluctuation.

Further, the gas flow resistor that is formed by bonding the low-porosity foam metal 79B to the high-porosity punching board 79A at both ends thereof in the width direction is provided at the gas inlet opening 72b of the casing body 72, and the glass coating 79C is also provided on the outer peripheral portions of the respective cell units in front of the gas inlet opening 72b. In this way, a discharge pressure at the entrance side of the gas outlet opening 72b of the casing body 72 is increased, and the air is more uniformly distributed all over the planes of the layers between the cell units 1.

Next, simulation of the flow of the air (the cathode gas) at the time of stationary power generation using the fuel cell according to the present invention and a fuel cell according to a comparative example will be described.

Figure 3:
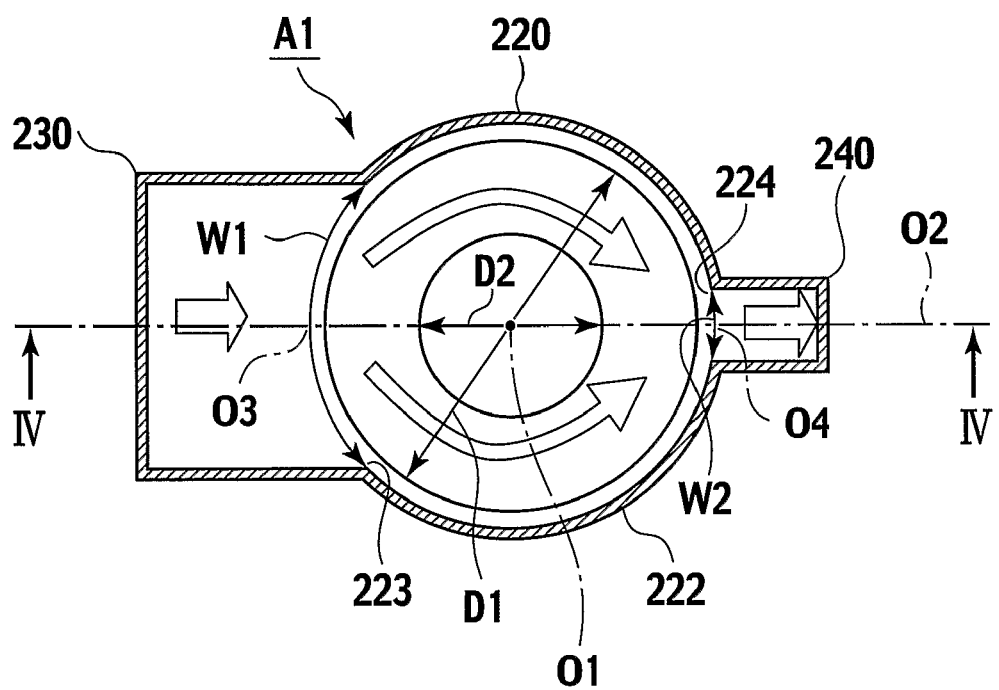
FIG. 3 is a plan sectional view of the fuel cell in FIG. 1.
Figure 4:
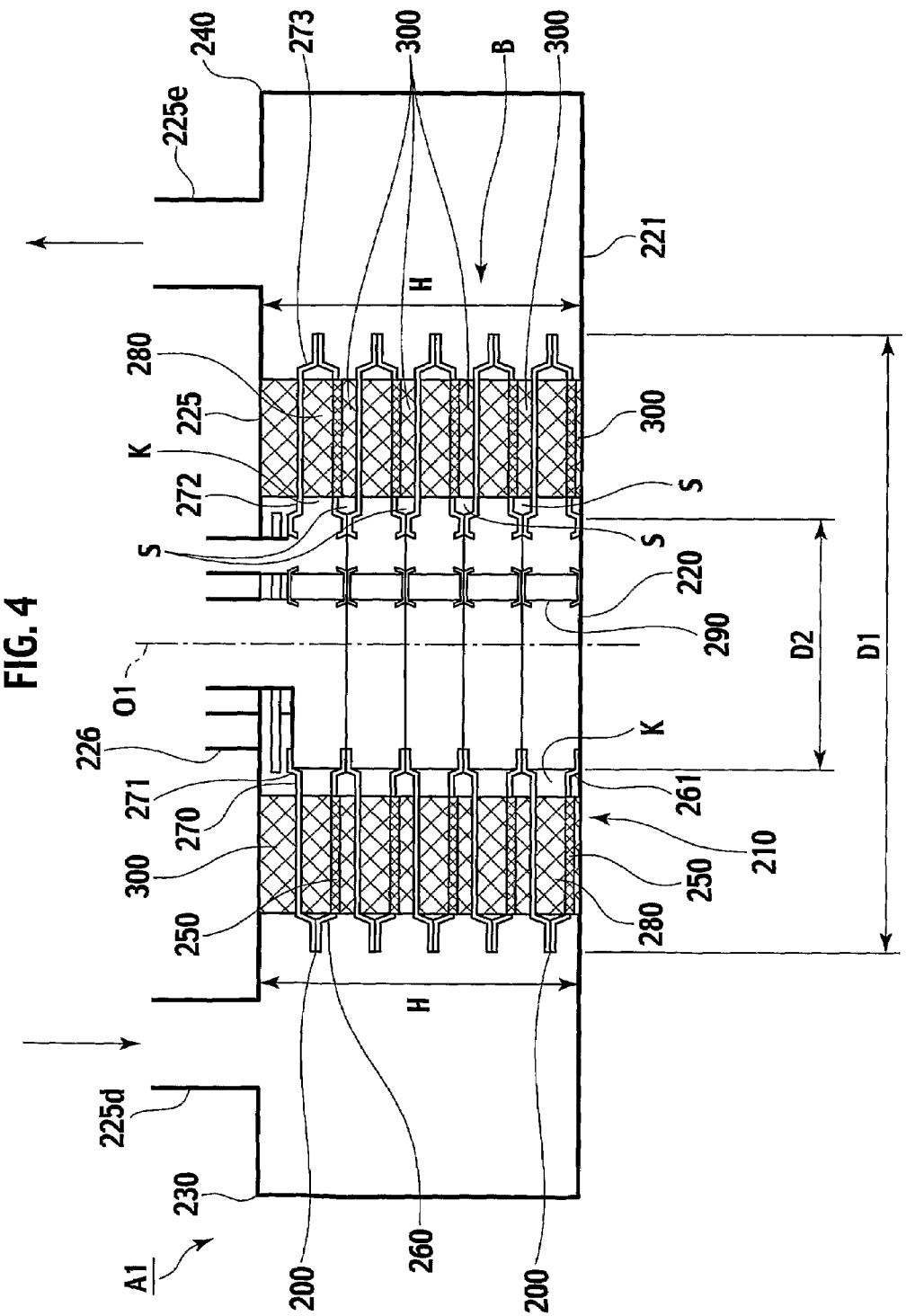
FIG. 4 is a cross-sectional view taken along the IV-IV line in FIG. 3.
Figure 5:
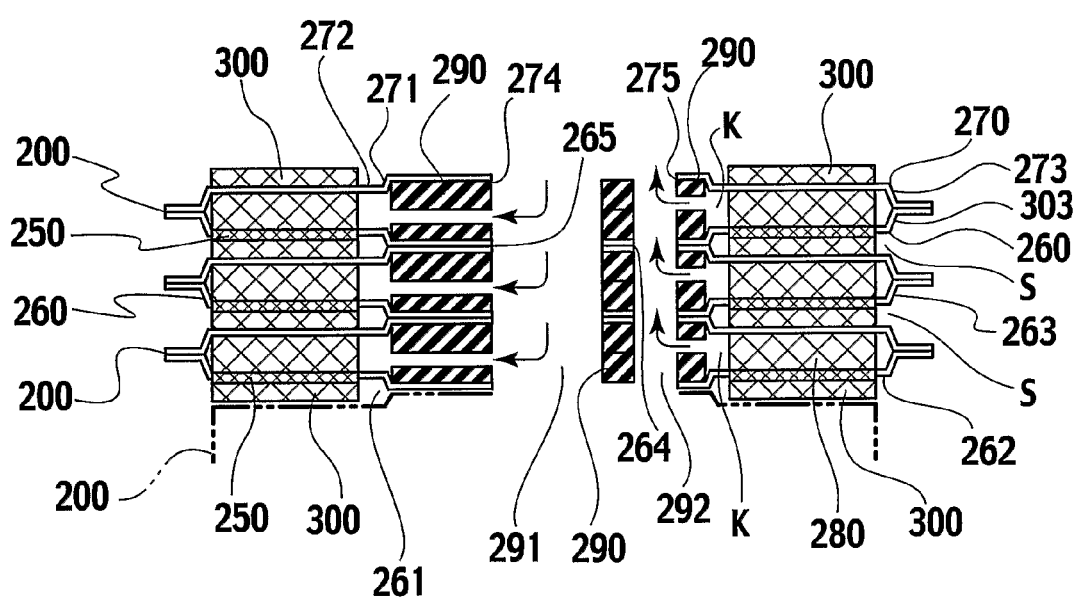
FIG. 5 is an enlarged cross-sectional view showing an enlarged part of a solid electrolyte fuel cell unit.

The fuel cell according to the present invention includes the casing in which the total opening width dimension W1 of the gas inlet opening is wider than the total opening width dimension W2 of the gas outlet opening (W1=80 mm and W2=20 mm, see FIG. 3).

The fuel cell according to the comparative example includes the casing in which the total opening width dimension W1 of the gas inlet opening is narrower than the total opening width dimension W2 of the gas outlet opening (W1=20 mm and W2=80 mm).

Conditions of the gases used in this simulation are shown in Table 1 and results of the simulation are shown in FIG. 15 to FIG. 18.

TABLE 1

|  | Cathode-introduced gas conditions | Anode-introduced gas conditions | Outside air condition |
| --- | --- | --- | --- |
| Flow rate [Nm$^3$/s] | 2.42E−05 | 5.23E−06 | — |
| Temperature [deg. C.] | 600 | 600 | 500 |
| Pressure [kPa] | 101.325 | 101.325 | — |
| O$_2$ mole ratio [mol %] | 21 | 0 | — |
| N$_2$ mole ratio [mol %] | 79 | 0 | — |
| H$_2$ mole ratio [mol %] | 0 | 97 | — |
| H$_2$O mole ratio [mol %] | 0 | 3 | — |

Figure 15:
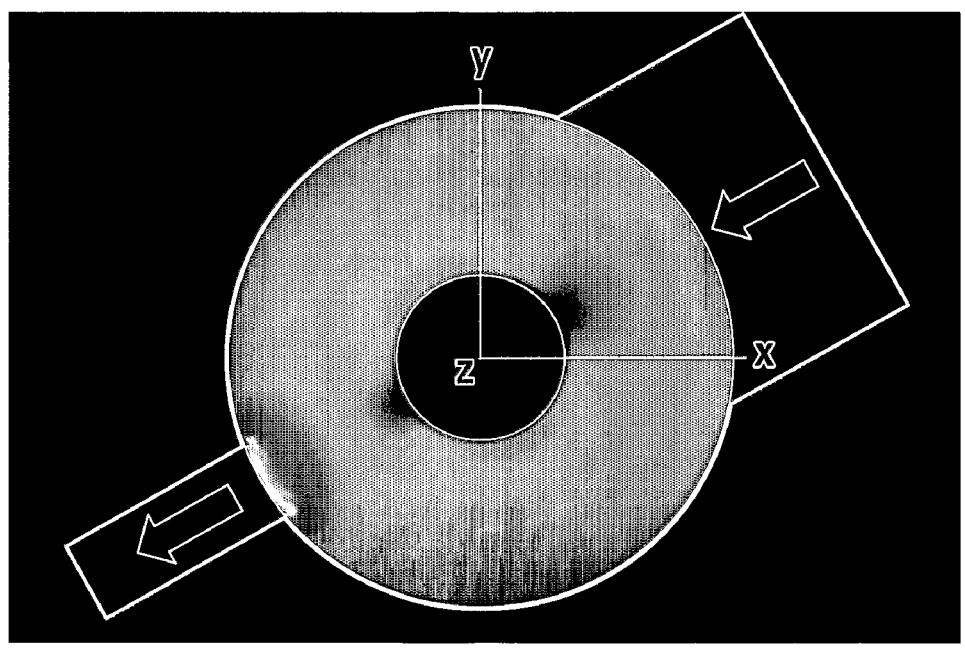
FIG. 15 is a distribution map of cathode gas velocity norm showing a result of airflow simulation at the time of stationary power generation of a fuel cell according to the present invention.
Figure 16:
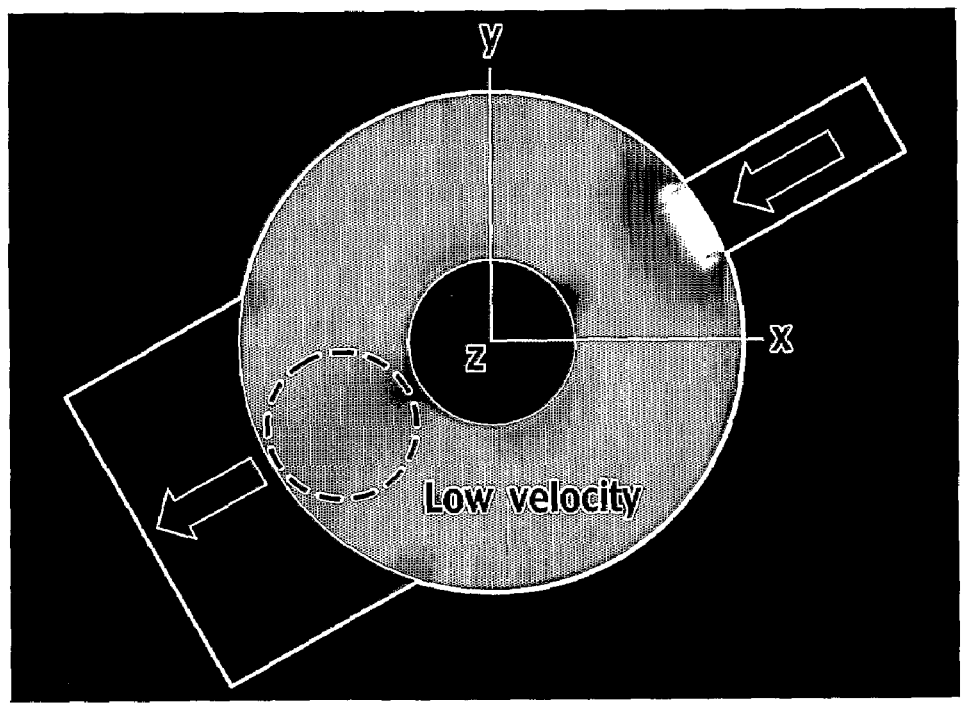
FIG. 16 is a distribution map of cathode gas velocity norm showing a result of airflow simulation at the time of stationary power generation of a fuel cell according to a comparative example.

As shown in the results of simulation in FIG. 15 and FIG. 16, the fuel cell of the comparative example having the total opening width dimension W1 of the gas inlet opening narrower than the total opening width dimension W2 of the gas outlet opening has smaller cathode gas velocity norm in a wake region downstream the abutting portion of the cell stack as compared to the fuel cell according to the present invention.

Specifically, it is apparent that the cathode gas flow velocity is reduced and the uniformity of the in-plane gas flow rate distribution is therefore deteriorated.

Figure 17:
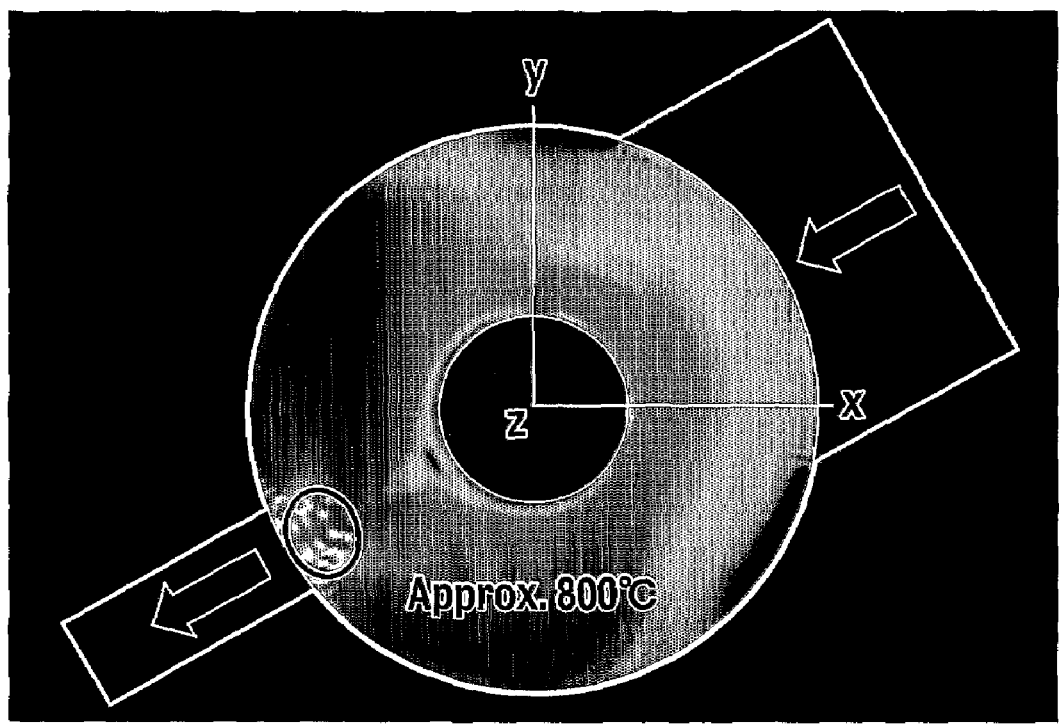
FIG. 17 is a distribution map of the cathode gas temperature showing the result of airflow simulation at the time of stationary power generation of the fuel cell according to the present invention.
Figure 18:
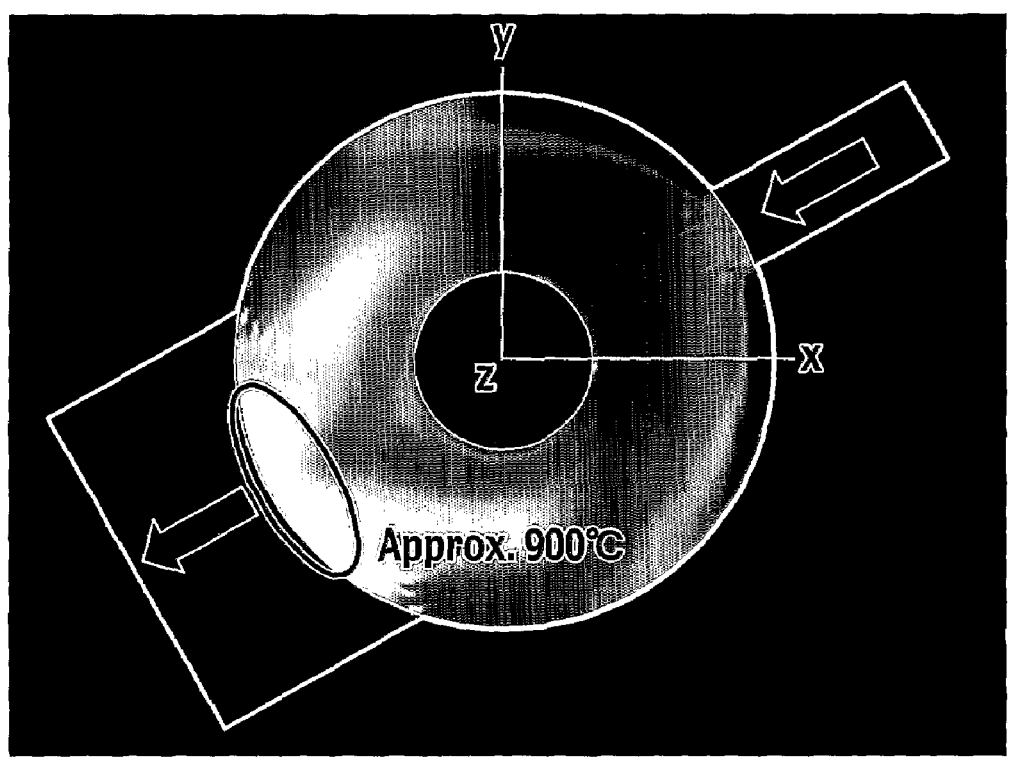
FIG. 18 is a distribution map of the cathode gas temperature showing the result of airflow simulation at the time of stationary power generation of the fuel cell according to the comparative example.

Meanwhile, as shown in the results of simulation in FIG. 17 and FIG. 18, the cathode gas temperature of the fuel cell according to the present invention is almost equal to 800° C. in the vicinity of the outlet opening where the cathode gas temperature becomes the highest, whereas the temperature is almost equal to 900° C. in the fuel cell of the comparative example.

Specifically, it is apparent that the fuel cell of the present invention can lower the maximum cathode gas temperature by about 100° C. Moreover, it is apparent that the fuel cell of the present invention having the total opening width dimension of the gas inlet opening wider than the total opening width dimension of the gas outlet opening can suppress a local rise in temperature in the vicinity of the gas inlet opening. Therefore, it is verified that the in-plane temperature distribution on the layer between the units can be equalized by setting the total opening width dimension W1 of the gas inlet opening of the casing body to be wider than the total opening width dimension W2 of the gas outlet opening.

Incidentally, in addition to the above-described characteristics concerning the respective opening width dimensions of the gas inlet opening and the gas outlet opening of the casing body, there are also characteristics concerning the numbers and layout positions of the gas inlet openings and the gas outlet openings. In addition, as will be described later, provision of current plates at the gas inlet openings and the gas outlet openings will also be deemed equivalent to the increase in the number of the gas inlet opening or the increase in the number of the gas outlet openings.

The unit cell in the present invention may be any of an electrode supported cell, an electrolyte supported cell, and a porous metal supported cell. As for the cell plate to hold the unit cell, it is preferable to use a material having the same thermal expansion coefficient as the thermal expansion coefficient of the unit cell.

For example, in the case of a fuel electrode supported cell with the electrode cell made of nickel/yttria-stabilized zirconia cermet, it is preferable to use a ferritic metal material having the thermal expansion coefficient around 10.E-6 [1/K] close to the thermal expansion coefficient of the fuel electrode. Among the ferritic metal materials, it is particularly preferable to use ferritic stainless steel (SUS430) or Crofer22APU.

Moreover, it is preferable to form the respective outer peripheral portions of the cell plates and the separator plates of the cell units by means of press working. When bonding the respective outer peripheral portions of the cell plates and the separator plates, it is possible to apply, but not limited to, welding, brazing, and moreover, an ultrasonic bonding method and so forth.

Further, a conductive porous material can be used for the current collector to be disposed within the area between the unit cells of the adjacent cell units. For example, it is possible to use, for example, a metal mesh, a foam metal, and moreover, to use fabrics, felts and the like of fibers made of metal or electrode materials. In particular, it is possible to use a Ni-type alloy such as Inconel which retains elasticity at a high temperature.

Moreover, it is also possible to use stainless steel containing a high degree (19% to 25%) of Cr such as Crofer22APU which has high oxidation resistance and high electric conductivity even under high temperature. However, as described previously, the material is not limited only to these substances.

In the case of a fuel cell including a cell stack having a central gas passage in the center thereof, it is difficult to distribute one reactant gas which is introduced from the gas inlet opening of the casing body and flowing to the gas outlet through the ex-unit current collectors provided between the mutually adjacent cell units of the cell stack, uniformly on the plane of the layer between the cell units where each ex-unit current collector is located. Particularly, the introduced gas tends to remain or flow relatively slowly in a wake region downstream the abutting portion.

In the fuel cell according to the present invention, in order to distribute the one reactant gas uniformly on the plane of the layer between the cell units, flow passage lengths from the gas inlet openings to the gas outlet openings of the casing body are set up as described below.

Figure 19:
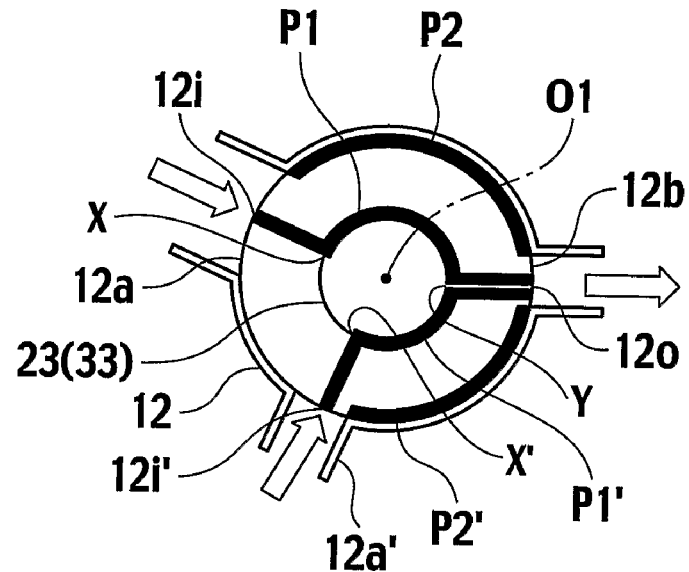
FIG. 19 is a simplified plan explanatory view of a fuel cell showing setup procedures for preferable flow passage lengths from gas inlet openings to gas outlet openings of a casing body in the case of executing high-efficiency operation.

FIG. 19 is a simplified plan explanatory view of the fuel cell showing set-up procedures for preferable flow passage lengths from gas inlet openings to gas outlet openings of the casing body, in the case of executing high-efficiency operation.

Specifically, as shown in FIG. 19, an intersection of line segment extending from a center 12$i$ in the width direction of the gas inlet opening 12$a$ of the casing body 12 toward the central axis line O1 and the circumference of the abutting portions 23 and 33 is defined as X, and an intersection of line segment extending from a center 12$i'$ in the width direction of the gas inlet opening 12$a'$ of the casing body 12 toward the central axis line O1 and the circumference of the abutting portions 23 and 33 is defined as X'. On the other hand, an intersection of a line segment extending from a center 12$o$ in the width direction of the gas outlet opening 12$b$ adjacent to the gas inlet openings 12$a$ and 12$a'$ toward the central axis line O1 and the circumference of the abutting portions 23 and 33 is defined as Y. Moreover, a flow passage through the center 12$i$ in the width direction of the gas inlet opening 12$a$, the intersections X, the intersection Y, and the center 12$o$ in the width direction of the gas outlet opening 12$b$ is defined as P1, and a flow passage through the center 12$i'$ in the width direction of the gas inlet opening 12$a'$, the intersection X', the intersection Y, and the center 12$o$ is defined as P1'. On the other hand, a flow passage along the peripheral wall of the casing body 12 between the gas inlet opening 12$a$ and the gas outlet opening 12$b$ is defined as P2, and a flow passage along the peripheral wall of the casing body 12 between the gas inlet opening 12$a'$ and the gas outlet opening 12$b$ is defined as P2' In this case, an absolute value of a difference between the length of the flow passage P1 and the length of the flow passage P2 is set equal to or below 40% of the length of the flow passage P1, and an absolute value of a difference between the length of the flow passage P1' and the length of the flow passage P2' is set equal to or below 40% of the length of the flow passage P1'.

This is because the reactant gas introduced from the gas inlet openings 12$a$ and 12$a'$ tends to flow more to a flow passage having a shorter flow passage length out of all flow passages to the outlet opening 12$b$. Accordingly, it is difficult to distribute the reactant gas uniformly over the entire plane of the layer between the solid electrolyte units.

Assume that the case of operation at the gas utilization equal to or above 60% for achieving high-efficiency operation and the absolute value of the differences between the lengths of the flow passages P1 (P1') and the lengths of the flow passages P2 (P2') exceeds 40% of the lengths of the flow passages P1 (P1'). In this case, a concentration of a portion of the reactant gas, out of the reactant gas introduced from the gas inlet openings 12$a$ (12$a'$), which flows on the flow passage having a longer flow passage length out of the flow passages to the outlet opening 12$b$, drops in the vicinity of the gas outlet opening, whereby power generation efficiency deteriorates. Therefore, it is possible to operate the fuel cell at high efficiency by setting the absolute value of the difference between the length of the flow passage P1 and the length of the flow passage P2 equal to or below 40% of the length of the flow passage P1.

For an application where the fuel cell is mounted on a vehicle, it is necessary to moderate fluctuation in the temperature distribution of the fuel cell and thereby to further improve the thermal shock resistance. This is because there are extremely high frequencies of cooling operation and the like besides stationary operation, which are attributable to events of start-up operation, load fluctuation, and overload.

For example, when the unit cell is glass bonded to the cell plate, there is a possibility of troubles on a glass-bonded portion attributable to thermal shock at the time of start-up when rapid heating is executed by introducing the one reactant gas at a high temperature from the gas inlet opening into the casing.

Moreover, at a stage of transition from a warming-up operation in which an off-gas from a combustor is introduced to the cell stack in order to retain the temperature of the fuel cell, to a loading operation in which 100% output is established, a large fluctuation occurs in the in-plane temperature distribution of the unit cell (the electrode supported cell in which the electrolyte is a thin film) when the fuel gas at a temperature lower than the temperature of the cell stack is introduced into the cell stack, which leads to separation of the electrode from the electrolyte due to thermal stress. Accordingly, there is a possibility of deterioration in the performance of the unit cell.

A unit cell, which is made of a material having the worst thermal conductivity among the materials of the fuel cell, is locally heated or cooled down when introducing the other reactant gas having a relatively higher or lower temperature into the casing. To prevent this problem, the inventor of the present invention has found out that it is preferable to set the total opening width dimension of the gas inlet openings to be equal to or greater than a difference between a radius of a solid electrolyte unit being substantially the same as a characteristic length of the unit cell itself and a radius of the central gas passage, and this configuration enables heating or cooling in an area substantially equal to the size of the unit cell and is therefore suitable for avoiding the above-described troubles.

As described above, by setting the total opening width dimension of the gas inlet openings of the casing body greater than the difference between the radius of the cell unit and the radius of the central gas passage, it is possible to moderate fluctuation in the in-plane temperature distribution on the layer between the cell units. As a result, the thermal stress on the cell unit (particularly at a joint between the unit cell and the cell plate) is reduced and the thermal shock resistance of the fuel cell is therefore improved.

Figure 20:
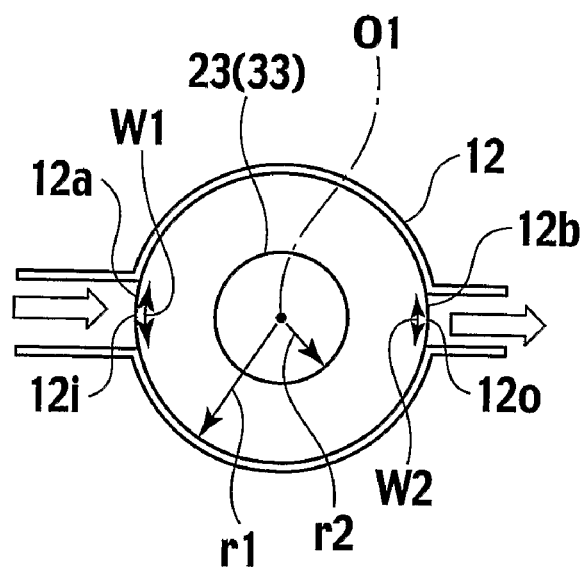
FIG. 20 is a simplified plan explanatory view concretely showing a pattern of widths and a positional relation between a gas inlet opening and a gas outlet opening on a casing of a fuel cell according to the present invention.

Furthermore, as shown in FIG. 20, the fuel cell of the present invention may have the casing body 12 provided with the single gas inlet opening 12a and the single outlet opening 12b, with the center 12i in the width direction of the gas inlet opening 12a, the central axis line O1, and the center 12o in the width direction of the gas outlet opening 12b of this casing body 12 located on substantially the same straight line in a cross section perpendicular to the stacking direction. In this case, as shown in FIG. 21, it is also possible to set the opening width dimension of the gas inlet opening 12a of the casing body 12 at least twice as large as the difference between the radius of the cell unit and the radius of the abutting portion.

Figure 21:
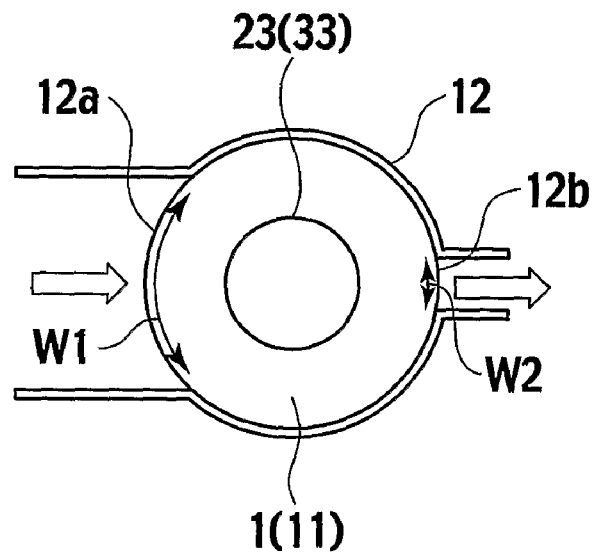
FIG. 21 is a simplified plan explanatory view concretely showing another pattern of widths and a positional relation between the gas inlet opening and the gas outlet opening on the casing of the fuel cell according to the present invention.
Figure 22:
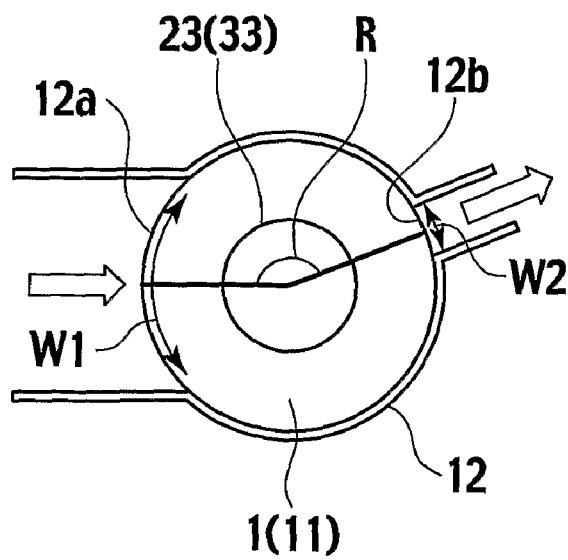
FIG. 22 is a simplified plan explanatory view concretely showing still another pattern of widths and a positional relation between the gas inlet opening and the gas outlet opening on the casing of the fuel cell according to the present invention.
Figure 23:
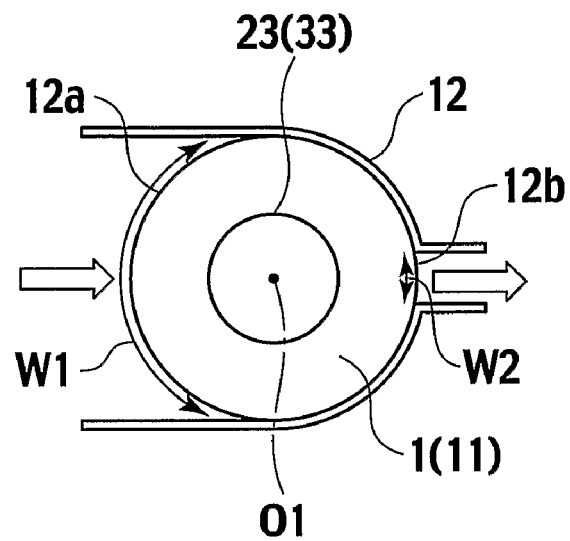
FIG. 23 is a simplified plan explanatory view concretely showing still another pattern of widths and a positional relation between the gas inlet opening and the gas outlet opening on the casing of the fuel cell according to the present invention.

To be more precise, assuming that the opening width dimension of the gas inlet opening 12a is defined as W1, that the opening width dimension of the gas outlet opening 12b is defined as W2, that the radius of the casing body 12 is defined as r1, that the radius of the abutting portion 23 (33) is defined as r2, that an angle defined by a line segment connecting the center 12i in the width direction of the gas inlet opening 12a to the central axis line O1 and a line segment connecting the center 12o in the width direction of the gas outlet opening 12b to the central axis line O1 is defined as R, and that r1-r2=a holds true, then it is possible to set W1=1.1a and W2=0.9a as shown in FIG. 20, or W1=2a and W2=a as shown in FIG. 21, or We=2a, W2=a, and R=165° as shown in FIG. 22, or W1=3.14r1 and W2=0.5a as shown in FIG. 23.

In terms of the fuel cell including the casing provided with the single gas inlet opening and the single gas outlet opening, the reason for employing the configuration to locate the center in the width direction of the gas inlet opening, the center of the abutting portion (the central axis line), and the center in the width direction of the gas outlet opening substantially on the same straight line is that otherwise, the one reactant gas is supplied to the layer between the cell units with a biased in-plane flow rate distribution, and the reaction heat generation is also biased in the plane of the layer at the time of power generation, and as a consequence, the in-plane temperature distribution may fluctuate largely, and the thermal stress due to the fluctuating distribution may cause the electrolyte of the unit cell to be cracked, whereby the fuel cell may fail to generate electric power.

Since the fuel cell with the center in the width direction of the gas inlet opening, the center of the abutting portion (the central axis line), and the center in the width direction of the gas outlet opening located substantially on the same straight line, has the single gas inlet opening and the single gas outlet opening, heat transfer from the cell stack to the casing is suppressed, and the start-up time thereof can be shortened.

Meanwhile, in the case that the opening width dimension of the gas inlet opening of the casing is set to be at least equal to twice as large as a difference between a radius of a solid electrolyte fuel cell unit and a radius of a central gas passage, or in other words, at least twice as large as the difference between the radius of the cell unit and the diameter of the abutting portion, it is possible for the gas flow passage which the gas introduced from the gas inlet opening into the inter-unit spaces between the units flows through and which is divided to the right and left passages by the central gas passage, or in other words, the abutting portions, to have a flow passage width (a width of a flow passage in a cross section perpendicular to the stacking direction) being maintained or smaller than the flow passage width at the gas inlet opening. In this way, it is possible to avoid a relatively larger pressure loss due to abrupt expansion of the flow passage width and thereby to improve the in-plane gas flow rate distributivity while reducing a pump loss, and to improve the uniformity in the in-plane temperature distribution.

Furthermore, in the fuel cell of the present invention, the casing body may be formed to include multiple gas inlet openings and gas outlet openings. Here, it is possible to set, each angle defined by a line segment connecting the center in the width direction of each of the gas inlet openings to the center of the abutting portion, and a line segment connecting the center of the abutting portion to the center in the width direction of the gas outlet opening located closest to the gas inlet opening, to be in a range greater than 80° but not exceeding 180°, in a cross section perpendicular to the stacking direction.

Assuming that each of the angles defined by the line segment connecting the center in the width direction of each of the gas inlet openings of the casing to the central axis line, and the line segment connecting the central axis line to the center in the width direction of the gas outlet opening located closest to the gas inlet opening is an acute angle, the one reactant gas entering the gas inlet opening flows out of the gas outlet opening located closest to the gas inlet opening without flowing around the abutting portion. Moreover, if a current plate is provided between the gas inlet opening and the gas outlet opening in order to prevent the short-circuiting of the one reactant gas flow, the inter-unit spaces between the cell units have to be expanded for the purpose of protecting the unit cells, which results in a decreased power output density. To avoid such an inconvenience, the above-described configuration is employed.

Next, concrete patterns of widths and positional relations of multiple gas inlet openings and gas outlet openings will be described with reference to FIG. 24 to FIG. 35.

Figure 24:
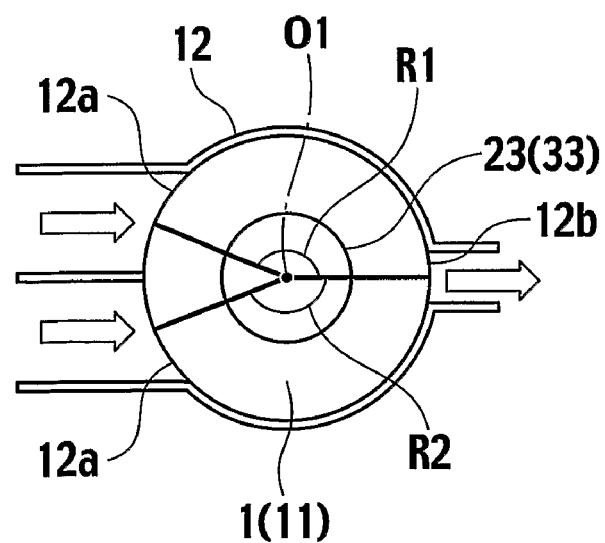
FIG. 24 is a simplified plan explanatory view concretely showing still another pattern of widths and a positional relation between the gas inlet openings and the gas outlet opening on the casing of the fuel cell according to the present invention.
Figure 25:
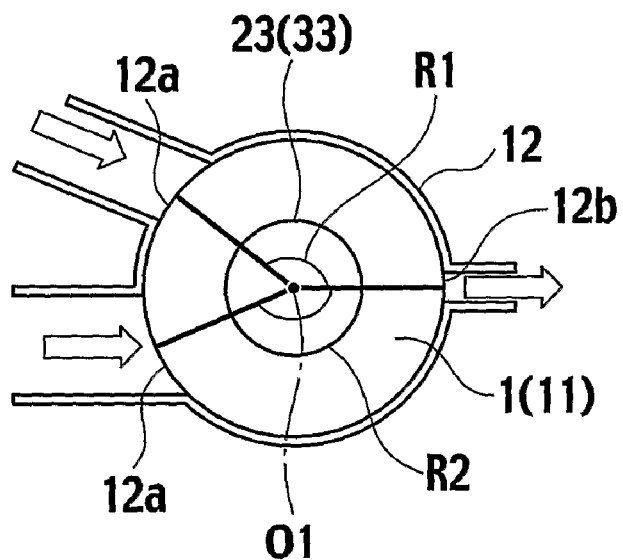
FIG. 25 is a simplified plan explanatory view concretely showing still another pattern of widths and a positional relation between the gas inlet openings and the gas outlet opening on the casing of the fuel cell according to the present invention.

As shown in FIG. 24 and FIG. 25, assuming that the casing body 12 includes two gas inlet openings 12a and one gas outlet opening 12b, that a sum of the respective opening width dimensions of the two gas inlet openings 12a is defined as W1, that the opening width dimension of the gas outlet opening 12b is defined as W2, that the radius of the casing body 12 is defined as r1, that the radius of the abutting portion 23 (33) is defined as r2, that the angles defined by the line segments connecting the centers in the width direction of the two gas inlet openings 12a to the central axis line O1 and the line segment connecting the center in the width direction of the gas outlet opening 12b to the central axis line O1 are respectively defined as R1 and R2, and that r1-r2=a holds true, then it is possible to set R1=R2=150°, W1=2a, and W2=a as shown in FIG. 24, or R1=120°, R2=150°, W1=2a, and W2=0.5a as shown in FIG. 25.

Figure 26:
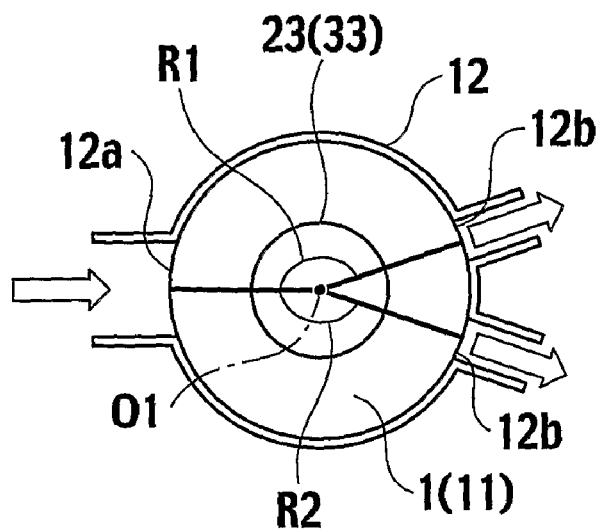
FIG. 26 is a simplified plan explanatory view concretely showing still another pattern of widths and a positional relation between the gas inlet opening and the gas outlet openings on the casing of the fuel cell according to the present invention.

Meanwhile, as shown in FIG. 26, assuming that the casing body 12 includes one gas inlet opening 12a and two gas outlet openings 12b, that the opening width dimension of the gas inlet opening 12a is defined as W1, that the a sum of the respective opening width dimensions of the two gas outlet openings 12b is defined as W2, that the radius of the casing body 12 is defined as r1, that the radius of the abutting portion 23 (33) is defined as r2, that the angles defined by the line segment connecting the center in the width direction of the gas inlet opening 12a to the central axis line O1 and the line segments connecting the centers in the width direction of the gas outlet openings 12b to the central axis line O1 are respectively defined as R1 and R2, and that r1-r2=a holds true, then it is possible to set R1=160°, R2=150°, W1=1.2a, and W2=a.

Figure 27:
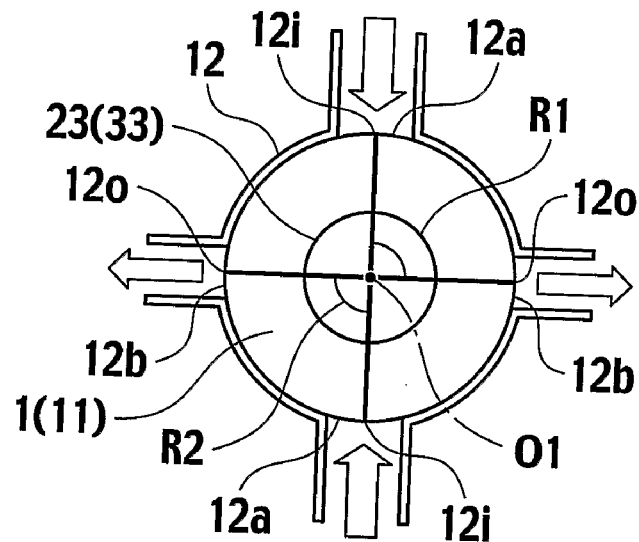
FIG. 27 is a simplified plan explanatory view concretely showing still another pattern of widths and a positional relation between the gas inlet openings and the gas outlet openings on the casing of the fuel cell according to the present invention.

Moreover, as shown in FIG. 27, it is also possible to provide the casing body 12 with two gas inlet openings 12a and two gas outlet openings 12b, to arrange the gas inlet openings 12a and the gas outlet openings 12b alternately in the circumferential direction, and to set the angles R1 and R2 defined by the line segments connecting the respective centers 12i in the width direction of the gas inlet openings 12a to the central axis line O1 and the line segments connecting the central axis line O1 to the centers in the width direction of the gas outlet openings located closest to the gas inlet openings respectively in a range greater than 80° but not exceeding 100°, in a cross section perpendicular to the stacking direction.

Figure 28:
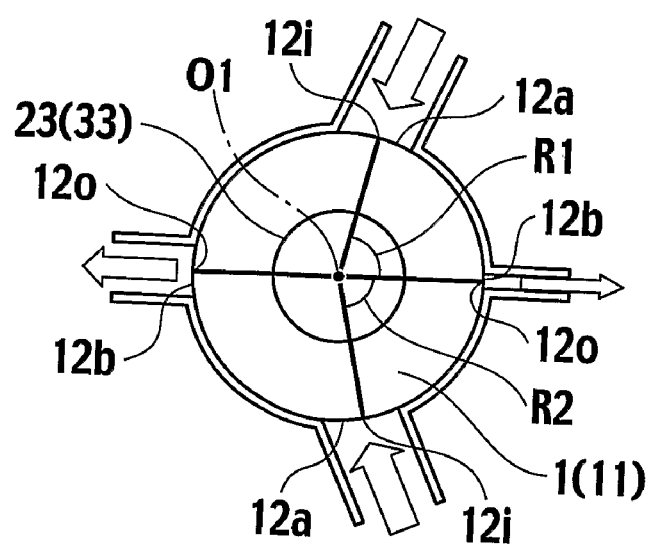
FIG. 28 is a simplified plan explanatory view concretely showing still another pattern of widths and a positional relation between the gas inlet openings and the gas outlet openings on the casing of the fuel cell according to the present invention.

To be more precise, assuming that a sum of the opening width dimensions of the two gas inlet openings 12a is defined as W1, that the a sum of the respective opening width dimensions of the two gas outlet openings 12b is defined as W2, that the radius of the casing body 12 is defined as r1, that the radius of the abutting portion 23 (33) is defined as r2, that the angles of the gas inlet openings 12a and the gas outlet openings are respectively defined as R1 and R2, and that r1-r2=a holds true, then it is possible to set R1=R2=90°, W1=3a, and W2=1.5a as shown in FIG. 27, or R1-R2=85°, W1=2a, and W2=1.1a as shown in FIG. 28.

Figure 29:
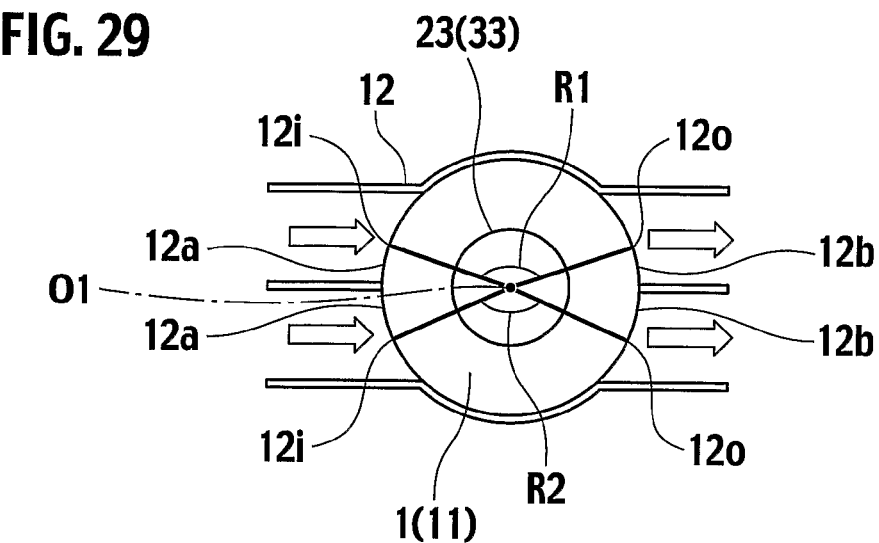
FIG. 29 is a simplified plan explanatory view concretely showing still another pattern of widths and a positional relation between the gas inlet openings and the gas outlet openings on the casing of the fuel cell according to the present invention.

When the gas inlet openings 12a and the gas outlet openings 12b are arranged side by side in the circumferential direction, it is possible to set R1=R2=140°, W1=2a, and W2=2a as shown in FIG. 29.

Figure 30:
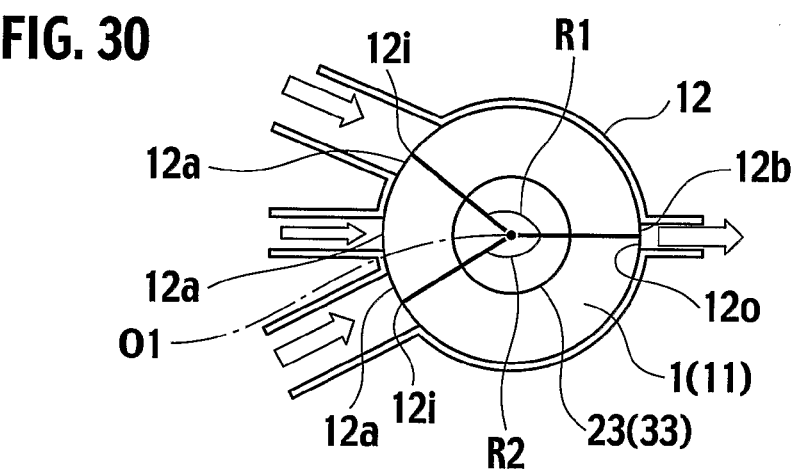
FIG. 30 is a simplified plan explanatory view concretely showing still another pattern of widths and a positional relation between the gas inlet openings and the gas outlet opening on the casing of the fuel cell according to the present invention.

Further, as shown in FIG. 30, assuming that the casing body 12 includes three gas inlet openings 12a and one gas outlet opening 12b, that a sum of the respective opening width dimensions of the three gas inlet openings 12a is defined as W1, that the opening width dimension of the gas outlet opening 12b is defined as W2, that the radius of the casing body 12 is defined as r1, that the radius of the abutting portion 23 (33) is defined as r2, that the angles defined by the gas outlet opening 12b and the two gas inlet openings 12a adjacent thereto are respectively defined as R1 and R2, and that r1-r2=a holds true, then it is possible to set R1=130°, R2=150°, W1=2.5a, and W2=0.3a.

Figure 31:
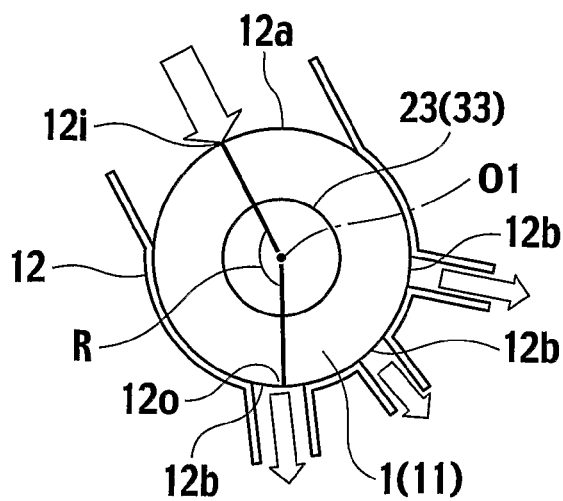
FIG. 31 is a simplified plan explanatory view concretely showing still another pattern of widths and a positional relation between the gas inlet opening and the gas outlet openings on the casing of the fuel cell according to the present invention.

Further, as shown in FIG. 31, assuming that the casing body 12 includes one gas inlet opening 12a and three gas outlet openings 12b, that the opening width dimension of the gas inlet opening 12a is defined as W1, that a sum of the respective opening width dimensions of the three gas outlet openings 12b is defined as W2, that the radius of the casing body 12 is defined as r1, that the radius of the abutting portion 23 (33) is defined as r2, that the angle defined by the gas inlet opening 12a and the gas inlet opening 12b located closest thereto is defined as R, and that r1-r2=a holds true, then it is possible to set R=120°, W1=3.5a, and W2=2.1a.

Figure 32:
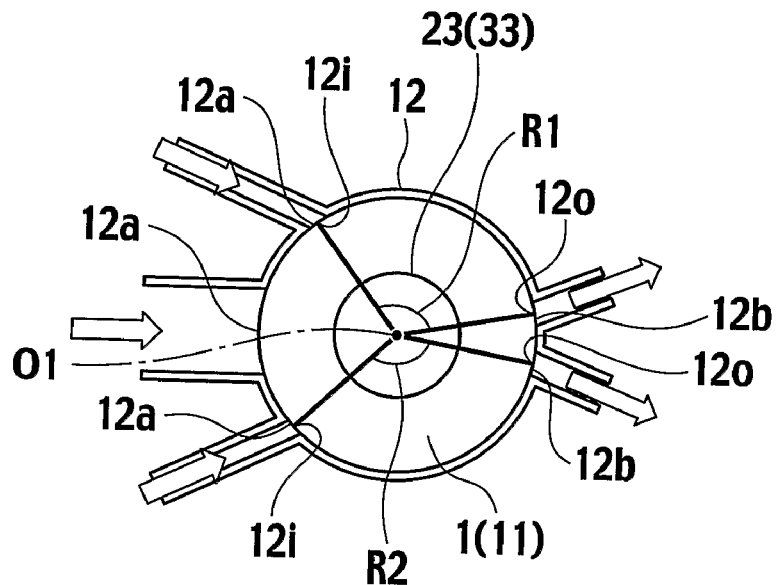
FIG. 32 is a simplified plan explanatory view concretely showing still another pattern of widths and a positional relation between the gas inlet openings and the gas outlet openings on the casing of the fuel cell according to the present invention.

Further, as shown in FIG. 32, assuming that the casing body 12 includes three gas inlet openings 12a and two gas outlet openings 12b arranged respectively in parallel, that a sum of the respective opening width dimensions of the three gas inlet openings 12a is defined as W1, that a sum of the respective opening width dimensions of the two gas outlet opening 12b is defined as W2, that the radius of the casing body 12 is defined as r1, that the radius of the abutting portion 23 (33) is defined as r2, that the angles defined by the two gas outlet openings 12b and the two gas inlet openings 12a adjacent thereto are respectively defined as R1 and R2, and that r1-r2=a holds true, then it is possible to set R1=R2=120°, W1=2a, and W2=a.

Figure 33:
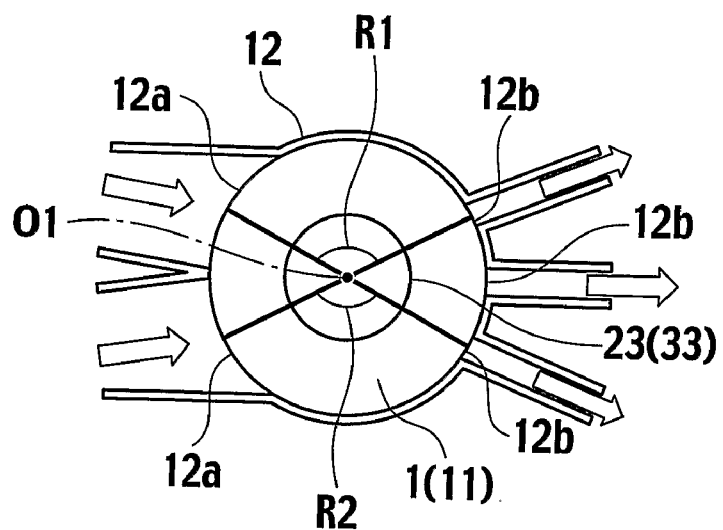
FIG. 33 is a simplified plan explanatory view concretely showing still another pattern of widths and a positional relation between the gas inlet openings and the gas outlet openings on the casing of the fuel cell according to the present invention.

Further, as shown in FIG. 33, assuming that the casing body 12 includes two gas inlet openings 12a and three gas outlet openings 12b arranged respectively in parallel, that a sum of the respective opening width dimensions of the two gas inlet openings 12a is defined as W1, that a sum of the respective opening width dimensions of the three gas outlet opening 12b is defined as W2, that the radius of the casing body 12 is defined as r1, that the radius of the abutting portion 23 (33) is defined as r2, that the angles defined by the two gas inlet openings 12a and the two gas outlet openings 12b adjacent thereto are respectively defined as R1 and R2, and that r1-r2=a holds true, then it is possible to set R1=R2=120°, W1=2.2a, and W2=a.

Figure 34:
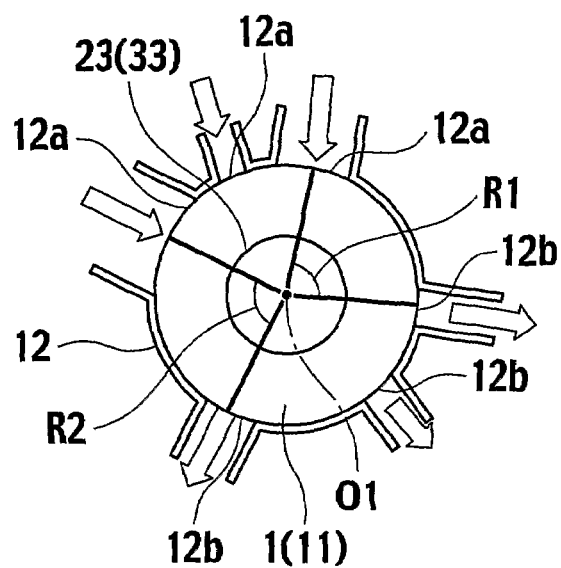
FIG. 34 is a simplified plan explanatory view concretely showing still another pattern of widths and a positional relation between the gas inlet openings and the gas outlet openings on the casing of the fuel cell according to the present invention.

Further, as shown in FIG. 34, assuming that the casing body 12 includes three gas inlet openings 12a and three gas outlet openings 12b arranged respectively in parallel, that a sum of the respective opening width dimensions of the three gas inlet openings 12a is defined as W1, that a sum of the respective opening width dimensions of the three gas outlet opening 12b is defined as W2, that the radius of the casing body 12 is defined as r1, that the radius of the abutting portion 23 (33) is defined as r2, that the angles defined by the two gas outlet openings 12b and the two gas inlet openings 12a adjacent thereto are respectively defined as R1 and R2, and that r1-r2=a holds true, then it is possible to set R1=100°, R2=90°, W1=2.5a, and W2=1.4a.

Although the patterns of the widths and the positional relations of the multiple gas inlet openings 12a and the gas outlet openings 12b have been concretely described above with reference to FIG. 24 to FIG. 34, the gas-introducing conduits 17 and the gas-discharge conduits 18 to be connected to the gas inlet openings 12a and the gas outlet openings 12b of the casing body 12 do not always have to extend in the orthogonal direction to the stacking direction of the cell units of the cell stack.

Figure 35:
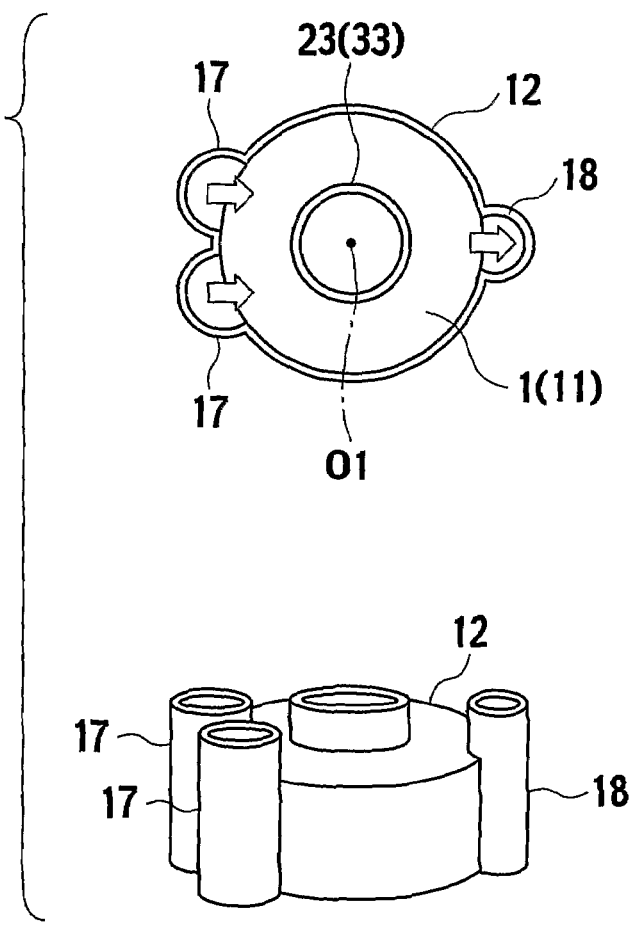
FIG. 35 is a simplified plan explanatory view showing another configuration example of gas-introducing conduits to be connected to the gas inlet openings on the casing of the fuel cell according to the present invention.

For example, as shown in FIG. 35, the gas-introducing conduits 17 and the gas-discharge conduit 18 may extend substantially in parallel to the stacking direction of the cell units along the side surface of the casing body 12.

Meanwhile, the shape of the gas-introducing conduits 17 and the gas-discharge conduits 18 is not necessarily limited to a straight tube. As shown in FIG. 33, it may be formed to be an expanded tube with an inside diameter being gradually expanded from an upstream side to a downstream side of the inflow of the reactant gas.

Moreover, in the fuel cell according to the present invention, it is possible to provide the gas flow resistor on the gas outlet opening of the casing for providing a resistance to the flow of the one reactant gas, which may be made of a punching board, a porous member, mesh, a fabric, a nonwoven fabric, a filler member, and the like. An evacuation pressure at the gas outlet opening is increased by employing this configuration. Accordingly, it is possible to distribute the one reactant gas more uniformly on the plane of the layer between the cell units.

Further, in the fuel cell according to the present invention, it is possible to provide the gas flow resistor in an electrically isolated state. In this case, it is possible to improve isolation between the cell units by use of the gas flow resistor. Accordingly, electrical leakage between the cell units is suppressed and deterioration in the power generation efficiency is avoided.

Moreover, in the fuel cell according to the present invention, the porosity of the gas flow resistor may be set smaller than porosity of the current collectors located between the cell units of the cell stack. By employing this configuration, it is possible to effectively increase pressure loss at the gas outlet opening in comparison with pressure loss when the one reactant gas flows through the inter-unit spaces, whereby uniformity of the in-plane gas flow rate distribution is improved.

Further, in the fuel cell according to the preset invention, the porosity of the gas flow resistor may be changed partially. In this case, it is possible to control the respective flow rates of the one reactant gas flowing on the outer peripheral portion of the inter-unit space and the one reactant gas flowing on the central portion of the inter-unit spaces by partially changing porosity of the gas flow resistor at the gas outlet opening, and to thereby achieve improvement in the uniformity of the in-plane gas flow rate distribution and the in-plane temperature distribution.

Moreover, the fuel cell of the present invention includes the gas flow-regulating member located in the gap between the case body and the cell stack, which creates a resistance to inflow of the one gas into the gap to thereby distribute the one gas uniformly on each electrode surface of the unit cell located between the cell units.

In this case, the gas flow-regulating member may apply castable refractory, fire-resistant foamed cement such as portland cement, alumina cement, phosphate cement or silicate cement, refractory mortar, plaster, ceramic adhesives, amorphous materials such as glass foam, felts mainly containing glass fibers, ceramic fibers or metal fibers, fabrics, knits, composite materials of these, and sheet materials such as metal foils, molded materials, and so forth. However, the applicable materials are not limited only to the foregoing.

Here, in order to reduce the heat stress on the cell units at the time of a temperature rise and avoid change in the size of the inter-unit space or the gap, it is preferable to use the same type of materials as the metal material constituting the cell units for the casing to house the cell stack, and to control an absolute difference between the thermal expansion coefficient of the gas flow-regulating member to be disposed in the gap between the casing body and the cell stack and the thermal expansion coefficient of the above-mentioned metal material within 10%.

However, it is possible to reduce the heat stress to be applied to the cell units by employing a configuration to allow the gas flow-regulating member and the respective cell units of the cell stack to contact one another in a mutually movable state. Accordingly, it is not always necessary to use the material having the thermal expansion coefficient substantially equal to that of the casing and the cell stack. Here, the expression "mutually movable" is synonymous with the expression "relatively movable".

In this case, the inner side surface of the casing body and the cell stack are merely approximated to each other. Therefore, it is possible to use ferritic metal as the metal material for forming the cell stack. Meanwhile, it is possible to use austenitic metal having excellent high-temperature strength and high oxidation resistance, namely, austenitic stainless steel (SUS310S) for the casing.

As described above, even when the metal material constituting the cell stack and the material of the casing have mutually different thermal expansion coefficients, it is still possible to reduce the heat stress to be applied to the cell units at the time of a temperature rise by allowing the gas flow-regulating member and the respective cell units of the cell stack to be in movable contact with one another. In addition, since it is also possible to hold the outer peripheral portions of the cell units by use of the gas flow-regulating member, it is possible to achieve thin profiling of the cell plates and the separator plates and to improve power output density as a consequence.

Further, in the fuel cell of the present invention, the porosity of the gas flow-regulating member may be set smaller than porosity of the ex-unit current collectors located between the cell units of the cell stack. By employing this configuration, it is possible to create a resistance to inflow of the one reactant gas into the gap between the cell stack and the casing body, and the amount of supply of the one reactant gas to the unit cells of the cell units is further increased. As a result, power generation efficiency is improved.

Further, in the fuel cell according to the preset invention, the porosity of the gas flow-regulating member may be set smaller than the porosity of the gas flow resistor. In this case, it is possible to guide the one reactant gas, which is supplied to the inter-unit spaces between the cell units, toward the gas outlet opening of the casing while avoiding the one reactant gas from flowing into the gap between the cell stack and the casing body.

Further, in the fuel cell of the present invention, the gas flow-regulating member may be electrically isolated from the cell units of the cell stack. By employing this configuration, it is possible to improve the electrical isolation performance between the cell units or between the cell units and the casing, by way of the gas flow-regulating member. As a result, power generation efficiency is improved by suppressing an electrical leakage loss.

In this case, as for an electrical isolation layer for electrically isolating the gas flow-regulating member from the cell units, it is possible to use a molded material with a ceramic sheet formed in a shape conforming to a shape of the gap between the casing body and the cell stack with the ceramic sheet being set between the molded material and the cell stack.

The present invention has been described above in detail. In any case, the configurations described in the respective embodiments are not limited to application solely to these embodiments, and the configuration described in one of the embodiments may be applied correspondingly or directly to other embodiments. Moreover, it is also possible to combine the configurations arbitrarily.

It is to be noted that the present invention will not be limited only to the above-described embodiments and it is also possible to carry out the following modified examples.

The above-described embodiment explains the example of locating the respective centers O3 and O4 in the width direction of the gas inlet opening 223 and the gas output opening 224 (the midpoints of the respective opening width dimensions W1 and W2) on the straight line O2 orthogonal to the central axis line of the abutting portions 261 and 271 of the cell units 200. However, the present invention is not limited to this configuration and the midpoints O3 and O4 may be slightly deviated from the straight line O2.

Meanwhile, the above-described respective embodiments explain the configuration wherein the abutting portions are integrally formed on the cell plates and the separator plates of the cell units in a protruding manner, respectively. However, as shown in FIG. 36, each of the abutting portions may be constituted of a part separate from the cell plate or the separator plate.

Figure 36:
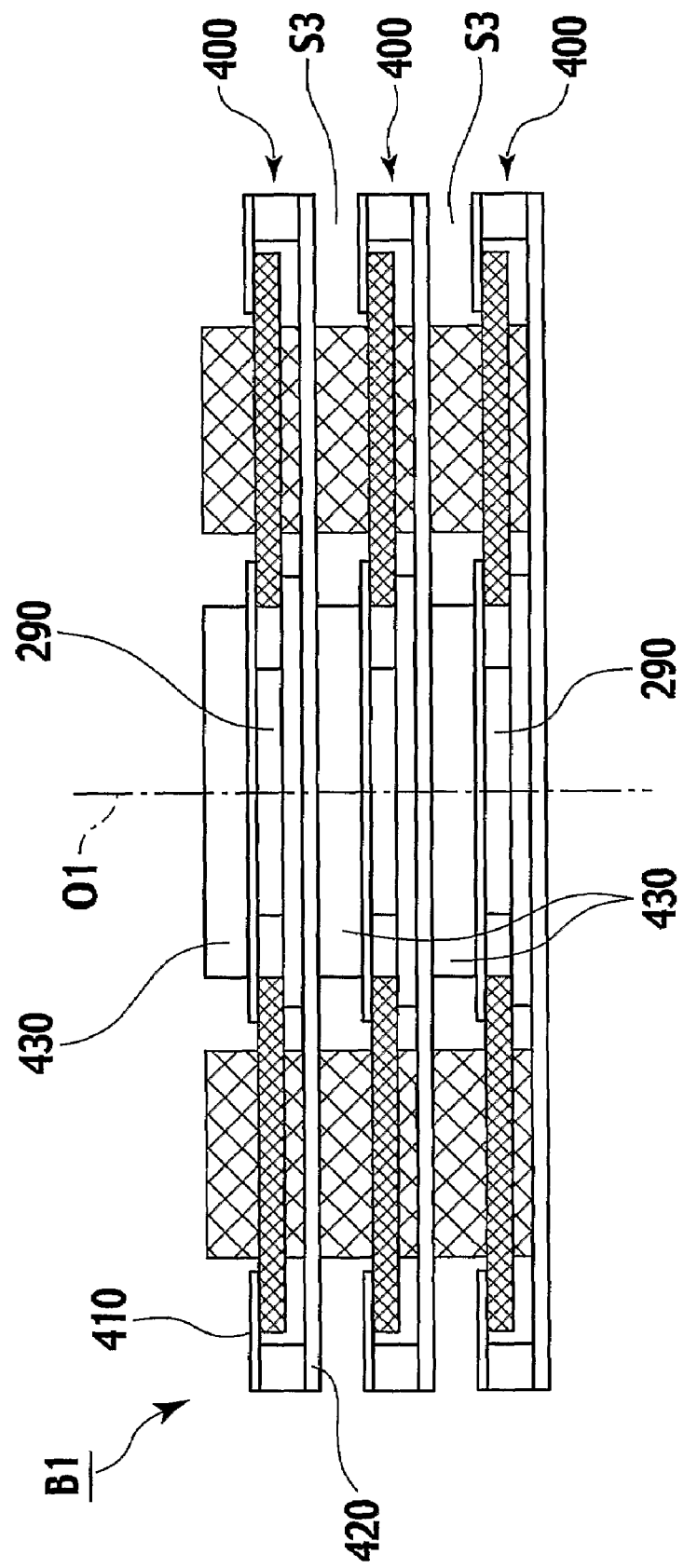
FIG. 36 is a cross-sectional view showing another example of the cell unit.

In a cell stack B1 shown in FIG. 36, abutting portions are not formed integrally with cell plates 410 and separator plates 420 of cell units 400. Instead, the respective cell units 400 are stacked together while interposing separate spacers 430 therebetween.

Specifically, the abutting portions in this embodiment are formed separately from the cell plates 410 and the separator plates 420.

The spacer 430 is formed into a columnar shape having a height for forming the inter-unit space S3 between the mutually adjacent cell units 400. The cell stack B1 is provided with the flow passage-forming members 290 which are similar to those described above, and the spacer 430 includes through holes (not shown) formed in positions corresponding to the gas inflow hole and the gas outflow hole of the flow passage-forming member 290 with diameters in the same sizes.

Specifically, the cell stack B1 is formed by stacking the respective cell units 400 formed into the disk shape while interposing the columnar spacers 430 for forming the inter-unit spaces S3 between the mutually adjacent cell units 400 with the central axis thereof aligning to the central axis line O1.

A state of flow of the one reactant gas in the above-described cell stack B1 is as follows.

The one reactant gas flowing into the casing through the gas inlet opening flows toward the gas outlet opening through the respective inter-unit spaces S3 in the cell stack B1, and is discharged from the casing body through the gas outlet opening.

The total opening width dimension of the gas inlet opening is set greater than the total opening width dimension of the gas outlet opening. Accordingly, the flow velocity of the one reactant gas is suppressed at the gas inlet opening. In this way, it is possible to prevent occurrence of a local and abrupt temperature change in the case of introducing a heated gas for rapid start-up or introducing the gas for temperature adjustment at the time of load fluctuation, and thereby to improve thermal shock resistance.

Moreover, it is possible to set a higher pressure loss of the one reactant gas at the gas outlet opening as compared to the gas inlet opening.

Further, it is possible to reduce a difference in a flow passage length between a flow passage from the gas inlet opening to the gas outlet opening through the vicinity of a surrounding area of the spacers 430 of the cell stack B1 (the central portion of the cell stack B1) and a flow passage from the gas inlet opening to the gas outlet opening through the vicinity of the outer periphery of the cell stack B1.

In addition, the one reactant gas is uniformly distributed on the plane of the layer between the cell units 400, thereby equalizing the in-plane temperature distribution on the layer between the cell units 400 at the time of stationary power generation.

This application is based upon and claims the benefit of priority from the prior Japanese Patent Application No. 2007-022915 filed on Feb. 1, 2007 and Japanese Patent Application No. 2007-261656 filed on Oct. 5, 2007, and the entire contents of these applications are incorporated in this specification of the invention by reference.

INDUSTRIAL APPLICABILITY

According to a fuel cell of the present invention, a total opening width dimension of a gas inlet opening of a casing is set greater than a total opening width dimension of a gas outlet opening thereof. Therefore, it is possible to drastically improve an in-layer flow rate distribution property of a reactant gas flowing in a layer between mutually stacked solid electrolyte fuel cell units. As a result, the fuel cell of the present invention is capable of obtaining generated power output efficiently and of improving thermal shock resistance at the time of operation start-up or load fluctuation associated with an ability to equalize in-plane temperature distribution on the layer between the units at the time of stationary power generation. Thus, the fuel cell of the present invention is industrially applicable.

The invention claimed is:

1. A fuel cell which is supplied with two reactant gases flowing separately from each other and generates electric power therefrom, the fuel cell comprising:
 a stack-structured member comprising a plurality of solid electrolyte fuel cell units stacked on one another in a stacking direction, wherein inter-unit spaces are provided between the respective fuel cell units and one of the two reactant gases is supplied to the respective inter-unit spaces and configured for use in power generation; and
 a casing for housing the stack-structured member including a peripheral wall surrounding the stack-structured member, the peripheral wall provided with a gas inlet opening configured to introduce the one of the two reactant gases into the inter-unit spaces and a gas outlet opening configured to discharge the one of the two reactant gases, wherein a total opening width dimension of the gas inlet opening is greater than a total opening width dimension of the gas outlet opening,
 wherein, in a cross section perpendicular to the stacking direction, an outer peripheral edge portion of each of the fuel cell units comprises:
 a first segment of a first length extending along the gas outlet opening;
 a second segment of a second length extending along the gas inlet opening, the second length being greater than the first length; and
 a third segment and a fourth segment disposed between the first and second segments, the third and fourth segments connecting the first and second segments and extending along the peripheral wall.

2. The fuel cell according to claim 1, wherein
 each of the fuel cell units is formed into a disk shape having a cylindrical abutting portion projected therefrom, each abutting portion abuts against an adjacent fuel cell unit to define the inter-unit space, and
 the fuel cell units are stacked together with the respective abutting portions aligned coaxially, wherein
 the total opening width dimension of the gas inlet opening is greater than a difference between a radius of the fuel cell unit and a radius of the abutting portion.

3. The fuel cell according to claim 2, wherein
 a center in a width direction of the gas inlet opening and a center in the width direction of the gas outlet opening are located on a straight line passing through a center of the abutting portion of the fuel cell unit in the cross section perpendicular to the stacking direction.

4. The fuel cell according to claim 2, wherein the opening width dimension of the gas inlet opening is at least twice as large as the radius of the abutting portion.

5. The fuel cell according to claim 1, wherein the gas outlet opening is provided with a gas flow resistor to provide a resistance to flow of the one of the two reactant gases.

6. The fuel cell according to claim 5, wherein the gas flow resistor is provided in an electrically isolated state.

7. The fuel cell according to claim 5, wherein ex-unit current collectors are disposed in the inter-unit spaces, and
a porosity of the gas flow resistor is smaller than a porosity of the ex-unit current collectors.

8. The fuel cell according to claim 5, wherein a porosity of the gas flow resistor is partially changed.

9. The fuel cell according to claim 1, wherein ex-unit current collectors are disposed in the inter-unit spaces, and
a gas flow-regulating member configured to cause the one of the two reactant gases introduced from the gas inlet opening to flow to the gas outlet opening through the ex-unit current collectors is provided in a gap between the casing and the stack-structured member.

10. The fuel cell according to claim 9, wherein the gas flow-regulating member is in movable contact with the respective fuel cell units.

11. The fuel cell according to claim 9, wherein a porosity of the gas flow-regulating member is smaller than a porosity of the ex-unit current collectors.

12. The fuel cell according to claim 9, wherein the gas outlet opening is provided with a gas flow resistor configured to provide a resistance to flow of the one of the two reactant gases, and
a porosity of the gas flow-regulating member is smaller than a porosity of the gas flow resistor.

13. The fuel cell according to claim 9, wherein the gas flow-regulating member is electrically isolated from the fuel cell units.

14. A fuel cell which is supplied with two reactant gases flowing separately from each other and generates electric power therefrom, the fuel cell comprising:
a stack-structured member comprising a plurality of solid electrolyte fuel cell units stacked on one another in a stacking direction, wherein inter-unit spaces are provided between the respective fuel cell units and one of the two reactant gases is supplied to the respective inter-unit spaces and configured for use in power generation; and
a casing for housing the stack-structured member including a peripheral wall surrounding the stack-structured member, the peripheral wall provided with a plurality of gas inlet openings configured to introduce the one of the two reactant gases into the inter-unit spaces and a plurality of gas outlet openings configured to discharge the one of the two reactant gases, wherein a total opening width dimension of the gas inlet openings is greater than a total opening width dimension of the gas outlet openings,
wherein, in a cross section perpendicular to the stacking direction, an outer peripheral edge portion of each of the fuel cell units comprises:
a first set of segments extending along the gas outlet openings, respectively;
a second set of segments extending along the gas inlet openings, respectively, a total length of the second set of segments being greater than a total length of the first set of segments; and
a third set of segments disposed between the segments of the first and second sets, connecting the segments of the first and second sets and extending along the peripheral wall, respectively,
wherein each of the fuel cell units is formed into a disk shape having a cylindrical abutting portion projected therefrom, each abutting portion abuts against an adjacent fuel cell unit to define the inter-unit space, and the fuel cell units are stacked together with the respective abutting portions aligned coaxially,
wherein the total opening width dimension of the gas inlet openings is greater than a difference between a radius of a fuel cell unit and a radius of an abutting portion.

15. The fuel cell according to claim 14, wherein each angle defined by a line segment connecting a center in a width direction of one of the gas inlet openings to a center of the abutting portion and a line segment connecting a center in a width direction of one of the gas outlet openings that is adjacent and closest to the one of the gas inlet openings, to the center of the abutting portion, in the cross section perpendicular to the stacking direction, is set in a range greater than 80° but not exceeding 180°.

16. The fuel cell according to claim 14, wherein the peripheral wall of the casing is provided with two gas inlet openings and two gas outlet openings alternately arranged along the peripheral wall, and
each angle defined by a line segment connecting a center in a width direction of one of the two gas inlet openings to a center of the abutting portion and a line segment connecting a center in a width direction of one of the two gas outlet openings that is adjacent and closest to the one of the two gas inlet openings, to the center of the abutting portion, in the cross section perpendicular to the stacking direction, is set in a range greater than 80° but not exceeding 100°.

17. The fuel cell according to claim 14, wherein gas-discharge conduits are respectively connected to the plurality of gas outlet openings, and
a sum of minimum cross-sectional areas of the respective gas-discharge conduits is equal to or below a sum of cross-sectional areas of the respective gas outlet openings.

18. The fuel cell according to claim 17, wherein a gas flow resistor configured to provide a resistance to flow of the one of the two reactant gases is provided on a gas-discharge conduit.

19. The fuel cell according to claim 17, wherein a control valve configured to control flow of the one of the two reactant gases is provided on a gas-discharge conduit.

* * * * *